(12) United States Patent
Hauck et al.

(10) Patent No.: US 7,389,371 B2
(45) Date of Patent: Jun. 17, 2008

(54) METHOD AND APPARATUS FOR LOOP BREAKING IN A DATA BUS

(75) Inventors: Jerrold Von Hauck, Fremont, CA (US); Colin Whitby-Strevens, Ben Lomond (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/725,711

(22) Filed: Mar. 19, 2007

(65) Prior Publication Data

US 2007/0255871 A1 Nov. 1, 2007

Related U.S. Application Data

(63) Continuation of application No. 11/021,337, filed on Dec. 21, 2004, now Pat. No. 7,194,564, which is a continuation of application No. 10/390,944, filed on Mar. 17, 2003, now Pat. No. 6,842,805, which is a continuation of application No. 09/435,160, filed on Nov. 5, 1999, now Pat. No. 6,587,904.

(51) Int. Cl.
*G06F 15/16* (2006.01)
*H04L 12/28* (2006.01)

(52) U.S. Cl. .................. 710/104; 709/221; 370/256
(58) Field of Classification Search .................. 710/104; 709/251, 221; 370/256, 222
See application file for complete search history.

(56) References Cited

U.S. PATENT DOCUMENTS

| | | | |
|---|---|---|---|
| 4,156,798 A | 5/1979 | Doelz | |
| 4,194,113 A * | 3/1980 | Fulks et al. | 714/732 |
| 5,014,262 A * | 5/1991 | Harshavardhana | 370/237 |
| 5,274,631 A | 12/1993 | Bhardwaj | |
| 5,321,812 A * | 6/1994 | Benedict et al. | 709/223 |
| 5,343,461 A | 8/1994 | Barton et al. | |
| 5,394,556 A * | 2/1995 | Oprescu | 709/220 |
| 5,406,643 A | 4/1995 | Burke et al. | |
| 5,452,330 A | 9/1995 | Goldstein | |
| 5,490,250 A | 2/1996 | Reschke et al. | |
| 5,490,253 A | 2/1996 | Laha et al. | |
| 5,495,481 A | 2/1996 | Duckwall | |
| 5,524,254 A | 6/1996 | Morgan | |

(Continued)

FOREIGN PATENT DOCUMENTS

EP    1 805 706    3/2001

(Continued)

OTHER PUBLICATIONS

P1394b Draft Standard for a High Performance Serial Bus (High Speed Supplement), P1394b Draft 1.3.3 Nov. 16, 2001.*

(Continued)

*Primary Examiner*—Paul R. Myers
(74) *Attorney, Agent, or Firm*—Gazdzinski & Associates

(57) ABSTRACT

A method and apparatus is disclosed for preventing loops in a full-duplex bus The method has the acts of: selecting at least two candidates to join said bus; establishing a dominant candidate from one of the candidates; testing for loops in said bus; and joining said dominant candidate is no loop is found in said bus. Alternate embodiments are shown that utilize unique identifiers to facilitate candidate selection and to establish dominance on the bus.

45 Claims, 22 Drawing Sheets

U.S. PATENT DOCUMENTS

| | | | |
|---|---|---|---|
| 5,539,390 A | 7/1996 | Nagano et al. | |
| 5,541,670 A | 7/1996 | Hanai | |
| 5,568,487 A | 10/1996 | Sitbon et al. | |
| 5,568,641 A | 10/1996 | Nelson et al. | |
| 5,583,922 A | 12/1996 | Davis et al. | |
| 5,621,659 A | 4/1997 | Matsumoto et al. | |
| 5,630,173 A | 5/1997 | Oprescu | |
| 5,632,016 A | 5/1997 | Hoch et al. | |
| 5,640,595 A | 6/1997 | Baugher et al. | |
| 5,642,515 A | 6/1997 | Jones et al. | |
| 5,654,657 A | 8/1997 | Pearce | |
| 5,684,715 A | 11/1997 | Palmer | |
| 5,701,476 A | 12/1997 | Fenger | |
| 5,701,492 A | 12/1997 | Wadsworth et al. | |
| 5,706,278 A | 1/1998 | Robillard et al. | |
| 5,712,834 A | 1/1998 | Nagano et al. | |
| 5,719,862 A | 2/1998 | Lee et al. | |
| 5,754,765 A | 5/1998 | Danneels et al. | |
| 5,764,930 A | 6/1998 | Staats | |
| 5,784,648 A | 7/1998 | Duckwall | |
| 5,802,048 A | 9/1998 | Duckwall | |
| 5,802,057 A | 9/1998 | Duckwall et al. | |
| 5,802,365 A | 9/1998 | Kathail et al. | |
| 5,805,073 A | 9/1998 | Nagano et al. | |
| 5,809,331 A | 9/1998 | Staats et al. | |
| 5,819,115 A | 10/1998 | Hoese et al. | |
| 5,826,027 A | 10/1998 | Pedersen et al. | |
| 5,826,038 A | 10/1998 | Nakazumi | |
| 5,832,298 A | 11/1998 | Sanchez et al. | |
| 5,835,761 A | 11/1998 | Ishii et al. | |
| 5,845,152 A | 12/1998 | Anderson et al. | |
| 5,862,129 A * | 1/1999 | Bell et al. | 370/236 |
| 5,867,730 A | 2/1999 | Leyda | |
| 5,875,301 A | 2/1999 | Duckwall et al. | |
| 5,923,663 A | 7/1999 | Bontemps et al. | |
| 5,930,480 A | 7/1999 | Staats | |
| 5,935,208 A | 8/1999 | Duckwall et al. | |
| 5,938,764 A | 8/1999 | Klein | |
| 5,940,600 A | 8/1999 | Staats et al. | |
| 5,954,796 A | 9/1999 | McCarty et al. | |
| 5,968,152 A | 10/1999 | Staats | |
| 5,970,052 A | 10/1999 | Lo et al. | |
| 5,987,605 A | 11/1999 | Hill et al. | |
| 5,991,842 A | 11/1999 | Takayama | |
| 6,009,480 A | 12/1999 | Pleso | |
| 6,032,202 A | 2/2000 | Lea et al. | |
| 6,032,261 A | 2/2000 | Hulyalkar | |
| 6,038,234 A | 3/2000 | LaFollette et al. | |
| 6,038,625 A | 3/2000 | Ogino et al. | |
| 6,070,187 A | 5/2000 | Subramaniam et al. | |
| 6,073,206 A | 6/2000 | Piwonka et al. | |
| 6,091,726 A | 7/2000 | Crivellari | |
| 6,115,764 A * | 9/2000 | Chisholm et al. | 710/100 |
| 6,122,248 A * | 9/2000 | Murakoshi et al. | 370/216 |
| 6,131,129 A | 10/2000 | Ludtke et al. | |
| 6,131,134 A | 10/2000 | Huang et al. | |
| 6,131,163 A | 10/2000 | Wiegel | |
| 6,133,938 A | 10/2000 | James | |
| 6,138,196 A | 10/2000 | Takayama et al. | |
| 6,141,702 A | 10/2000 | Ludtke et al. | |
| 6,141,767 A | 10/2000 | Hu et al. | |
| 6,145,018 A * | 11/2000 | LaFollette et al. | 710/8 |
| 6,157,972 A * | 12/2000 | Newman et al. | 710/100 |
| 6,160,796 A * | 12/2000 | Zou | 370/257 |
| 6,167,532 A | 12/2000 | Wisecup | |
| 6,173,327 B1 | 1/2001 | De Borst et al. | |
| 6,192,189 B1 | 2/2001 | Fujinami et al. | |
| 6,199,119 B1 | 3/2001 | Duckwall et al. | |
| 6,202,210 B1 | 3/2001 | Ludtke | |
| 6,212,171 B1 | 4/2001 | LaFollette et al. | |
| 6,212,633 B1 | 4/2001 | Levy et al. | |
| 6,219,697 B1 | 4/2001 | Lawande et al. | |
| 6,226,680 B1 | 5/2001 | Boucher et al. | |
| 6,233,615 B1 | 5/2001 | Van Loo | |
| 6,233,624 B1 | 5/2001 | Hyder et al. | |
| 6,243,778 B1 | 6/2001 | Fung et al. | |
| 6,247,063 B1 | 6/2001 | Ichimi et al. | |
| 6,247,083 B1 | 6/2001 | Hake et al. | |
| 6,253,114 B1 | 6/2001 | Takihara | |
| 6,253,255 B1 | 6/2001 | Hyder et al. | |
| 6,256,059 B1 | 7/2001 | Fichtner | |
| 6,260,063 B1 | 7/2001 | Ludtke et al. | |
| 6,266,334 B1 | 7/2001 | Duckwall | |
| 6,266,344 B1 | 7/2001 | Fujimori et al. | |
| 6,266,701 B1 | 7/2001 | Sridhar et al. | |
| 6,275,889 B1 | 8/2001 | Saito | |
| 6,282,597 B1 | 8/2001 | Kawamura | |
| 6,292,840 B1 | 9/2001 | Blomfield-Brown et al. | |
| 6,295,479 B1 | 9/2001 | Shima et al. | |
| 6,308,222 B1 | 10/2001 | Krueger et al. | |
| 6,311,228 B1 | 10/2001 | Ray | |
| 6,314,461 B2 | 11/2001 | Duckwall et al. | |
| 6,343,321 B2 | 1/2002 | Patki et al. | |
| 6,345,315 B1 | 2/2002 | Mishra | |
| 6,347,362 B1 | 2/2002 | Schoinas et al. | |
| 6,353,868 B1 | 3/2002 | Takayama et al. | |
| 6,356,558 B1 | 3/2002 | Hauck et al. | |
| 6,363,085 B1 | 3/2002 | Samuels | |
| 6,373,821 B2 | 4/2002 | Staats | |
| 6,385,679 B1 | 5/2002 | Duckwall et al. | |
| 6,405,247 B1 | 6/2002 | Lawande et al. | |
| 6,411,628 B1 | 6/2002 | Hauck et al. | |
| 6,418,150 B1 | 7/2002 | Staats | |
| 6,425,019 B1 | 7/2002 | Tateyama et al. | |
| 6,426,962 B1 | 7/2002 | Cabezas et al. | |
| 6,442,630 B1 | 8/2002 | Takayama et al. | |
| 6,446,116 B1 | 9/2002 | Burridge | |
| 6,446,142 B1 | 9/2002 | Shima et al. | |
| 6,452,975 B1 | 9/2002 | Hannah | |
| 6,457,086 B1 | 9/2002 | Duckwall | |
| 6,466,982 B1 | 10/2002 | Ruberg | |
| 6,496,862 B1 | 12/2002 | Akatsu et al. | |
| 6,502,144 B1 | 12/2002 | Accarie | |
| 6,513,085 B1 | 1/2003 | Gugel et al. | |
| 6,519,657 B1 | 2/2003 | Stone et al. | |
| 6,529,522 B1 | 3/2003 | Ito et al. | |
| 6,574,588 B1 | 6/2003 | Shapiro et al. | |
| 6,587,904 B1 * | 7/2003 | Hauck et al. | 710/107 |
| 6,591,300 B1 | 7/2003 | Yurkovic | |
| 6,606,320 B1 | 8/2003 | Nomura et al. | |
| 6,618,750 B1 | 9/2003 | Staats | |
| 6,618,785 B1 | 9/2003 | Whitby-Streves | |
| 6,621,832 B2 | 9/2003 | Staats | |
| 6,628,607 B1 | 9/2003 | Hauck et al. | |
| 6,631,426 B1 | 10/2003 | Staats | |
| 6,636,914 B1 | 10/2003 | Johas Teener | |
| 6,639,918 B1 | 10/2003 | Hauck et al. | |
| 6,643,714 B1 | 11/2003 | Chrysanthakopoulos | |
| 6,671,768 B1 | 12/2003 | Brown | |
| 6,686,838 B1 | 2/2004 | Rezvani et al. | |
| 6,691,096 B1 | 2/2004 | Staats | |
| 6,718,497 B1 | 4/2004 | Whitby-Strevens | |
| 6,842,805 B1 * | 1/2005 | Hauck et al. | 710/104 |
| 6,970,431 B1 * | 11/2005 | Iijima et al. | 370/254 |
| 6,985,981 B1 * | 1/2006 | Hauck et al. | 710/107 |
| 7,194,564 B2 * | 3/2007 | Hauck et al. | 710/104 |

FOREIGN PATENT DOCUMENTS

EP    1 805 706    10/2002

OTHER PUBLICATIONS

P1394a Draft Standard for a High Performance Serial Bus (Supplement) Draft 2.0 Mar. 15, 1998.

Bregni et al., "Jitter Testing Technique and Results at VC-4 Desynchronizer Output of SDH Equipment," IEEE International Conference on Communications, vol. 3, pp. 1407-1410, May 12, 1994.

"Information Technology-Microprocessor systems—Control and Status Registers (CSR) Architecture for microcomputer buses," ANSI/IEEE Standard 1212, The Institute of Electrical and Electronics Engineers, Inc. pp. 1-122, 1994 Edition.

Bregni et al., "Jitter Testing Technique and Results at VC-4 Desynchronizer Output of SDH Equipment," IEEE Transactions on Instrumentation and Measurement, vol. 44, Issue 3, pp. 675-678, Jun. 1995.

"IEEE Standard for a High Performance Serial Bus," IEEE Standard 1394-1995, Institute of Electrical and Electronics Engineers, Inc., pp. 1-384, approved Jul. 22, 1996.

Shiwen et al., "Parallel positive justification in SDH C-4 mapping," IEEE International Conference on Communications, vol. 3, pp. 1577-1581, Jun. 12, 1997.

"AV/C Digital Interface Command Set General Specification," Rev. 3.0, 1394 Trade Association, pp. 4-5, 20-34, Apr. 15, 1998.

"Enhancements to the AV/C General Specification 3.0 Version 1.0FCI," 1394 Trade Association, pp. 4, 6-17 Nov. 5, 1998.

"Fibre Channel-Methodologies for Jitter Specification," NCITS TR-25-1999, Jitter Working Group Technical Report, Rev. 10, pp. 1-96, Jun. 9, 1999.

"P1394a Draft Standard for a High Performance Serial Bus (Supplement)," Draft 3.0, Institute of Electrical and Electronics Engineers, Inc., pp. 1-187, Jun. 30, 1999.

"IEEE Standard for a High Performance Serial Bus-Amendment 1," Institute of Electrical and Electronics Engineers, Inc., pp. 1-196, approved Mar. 30, 2000.

"P1394b IEEE Draft Standard for a High Performance Serial Bus (High Speed Supplement) P1394b Draft 1.3.3," Institute of Electrical and Electronics Engineers, Inc., pp. 1-408, Nov. 16, 2001.

"1394b IEEE Standard for a High Performance Serial Bus-Amendment 2," Institute of Electrical and Electronics Engineers, Inc. pp. I-xxx, 2002.

* cited by examiner

US 7,389,371 B2

METHOD AND APPARATUS FOR LOOP BREAKING IN A DATA BUS

PRIORITY CLAIM

This application is a continuation of and claims priority to co-owned and U.S. patent application Ser. No. 11/021,337 entitled "Method and Apparatus for Preventing Loops in a Full-Duplex Bus" filed Dec. 21, 2004 now U.S. Pat. No. 7,194,564, which is a continuation of co-owned and U.S. patent application Ser. No. 10/390,944, filed Mar. 17, 2003, now U.S. Pat. No. 6,842,805, issued Jan. 11, 2005, of the same title, which is a continuation application of co-owned and U.S. patent application Ser. No. 09/435,160, filed Nov. 5, 1999, now U.S. Pat. No. 6,587,904, issued Jul. 1, 2003, of the same title, each of which are herein incorporated by reference in their entirety.

BACKGROUND OF THE INVENTION

1. Field of the Invention

The present invention relates to serial bus management. In particular, the present invention relates to a method and apparatus for preventing loops in a serial bus system.

2. The Prior Art

Modern electronic equipment has greatly enhanced the quality of our lives. However, as the use of such equipment has increased, so has the need to connect equipment purchased from different manufacturers. For example, while a computer and a digital camera may each be useful when used alone, the ability to connect the digital camera to the computer and exchange information between the two makes the combination even more useful. Therefore, a need was apparent for a serial bus standard that would allow for the connection and communication between such devices.

The IEEE 1394-1995 standard was developed to satisfy this need. This standard, revolutionized the consumer electronics industry by providing a serial bus management system that featured high speeds and the ability to "hot" connect equipment to the bus; that is, the ability to connect equipment without first turning off the existing connected equipment. Since its adoption, the IEEE 1394-1995 standard has begun to see acceptance in the marketplace with many major electronics and computer manufacturers providing IEEE 1394-1995 connections on equipment that they sell.

However, as technologies improved, the need to update the IEEE 1394-1995 standard became apparent. Improvements such as higher speeds and longer connection paths are needed. There is currently an improved standard in development, herein referred to as the P1394b, which will provide such improvements.

One problem that is associated with serial bus systems is that of loops occurring in a system. In order for a serial bus system to function properly, one end of the bus cannot be connected to the other. Loops typically occur when an end user, typically a consumer, inadvertently connects a new device to the bus in such a manner that a loop is formed. If this occurs, a "loop" is formed in the system, and the system will fail to properly initialize. Once a loop is formed, the system will not function properly, since communications between devices is impossible.

Consequentially, there is a need for an method for managing a serial bus system that detects when a loop has been formed, and eliminates the loop.

Furthermore, since there will be equipment utilizing both the $\alpha$ and $\beta$ standards on the market, there is a need for a serial bus loop-breaking system that is compatible with the $\beta$ standard, and is backwards-compatible with the $\alpha$ standard.

Finally there is a need for a system that prevents the above problems by building a loop-free connection from the start.

BRIEF DESCRIPTION OF THE INVENTION

The invention satisfies the above needs. The present invention relates to a method and apparatus for preventing loops in a full-duplex bus. A preferred method for preventing loops in a full-duplex bus has the following acts: selecting at least two candidates to join the bus; establishing a dominant candidate from one of the at least two candidates; testing for loops in the bus; and joining the dominant candidate if no loops are found in the bus.

Another preferred method for preventing loops in a full-duplex bus has the following acts: selecting a plurality candidates to join the bus: establishing at least one dominant candidate; testing for loops in the bus; and joining the at least one dominant candidate if no loops are found in the bus.

Another preferred method for breaking loops in a bus containing both full-duplex and uniplex devices is disclosed, the method comprising the acts of: determining whether the loop comprises only full-duplex devices and breaking the loop at any point on the bus; determining whether the loop comprises only uniplex devices and quarantining the loops comprising uniplex devices from the bus; and determining whether the loop comprises both uniplex and full-duplex devices, and breaking the loop by utilizing only full-duplex device to break the loop.

An electronic device adapted to communicate on a full-duplex bus is disclosed, the device comprising: means for selecting two candidates to join the bus; means for establishing a dominant candidate; means for testing for loops in the bus; and means for joining the dominant candidate if no loops are found in the bus.

An electronic device adapted to communicate on a full-duplex bus is disclosed, the device comprising: means for selecting a plurality candidates to join the bus; means for establishing at least one dominant candidate; means for testing for loops in the bus; and means for joining the at least one dominant candidate if no loops are found in the bus.

A method for detecting and breaking loops in a full-duplex electronic bus is disclosed, the method comprising the acts of: selecting candidates to join to the bus; arbitrating for control of the bus; transmitting a loop test packet containing a unique identifier on the bus; receiving loop test packets from the bus, the received loop test packets containing a unique identifier; surrendering control of the bus if any the unique identifier contained in any the received loop test packet is greater than the unique identifier contained in the transmitted loop test packet and waiting for the bus to return to idle before attempting to join the bus again; and joining the selected candidates to the bus if any the unique identifier contained in the transmitted loop test packet is greater than or equal to any the unique identifier contained in the received loop test packet.

A method for detecting and breaking loops in a full-duplex electronic bus, the method comprising the acts of: connecting a device to the bus; testing for a loop in the bus; quarantining the device from the bus a loop is found; resuming the device if no loop is found; testing for a loop in the bus if the device does not resume within a predetermined time period; activating the device; and testing for a loop in the bus if the device does not activate within the predetermined time period.

Finally, a program storage device readable by a machine, tangibly embodying a program of instructions executable by a machine to prevent loops on a full-duplex bus, is disclosed, the device comprising: means for selecting a plurality candidates to join the bus; means for establishing at least one dominant candidate; means for testing for loops in the bus; and means for joining the at least one dominant candidate if no loops are found in the bus.

In another aspect of the invention, a method of operating a high-speed data bus comprising at least two nodes is disclosed. In one embodiment, the bus and nodes form a loop, and the method comprises: determining whether the at least two nodes comprise the same type of node; and if the determining indicates the same type of node, breaking the loop between any of the at least two nodes.

In another embodiment, the high-speed data bus comprises at least first and second nodes and a loop, the first node comprising a different type of node than the second node and being in communication with the loop via the second node, and the method comprises breaking the bus between the first and second node so as to sever the loop from the bus. In one variant, the first node comprises an IEEE-1394b-compliant node, the second node comprises a hybrid node, and the loop comprises a plurality of IEEE-1394a-compliant nodes.

In yet another embodiment, the plurality comprises: (i) a plurality of a first type of node, at least two of the plurality of first type of node being in communication with one another without any other nodes interposed there between; and (ii) at least one of a second type of node; and (iii) at least one of a third type of node, the third type comprising attributes of the first and second types of nodes, and the method comprises selectively breaking the loop between the at least two nodes.

In a further aspect of the invention, a method of loop breaking in a high-speed serialized bus is disclosed. In one embodiment, the bus comprises a plurality of nodes of a first type and at least one node of a second type, and the operation of the at least one node is adversely affected by breaking the loop between the at least one node and another node immediately proximate thereto within the loop. The method comprises: identifying at least two of the first type of node of the plurality that are logically adjacent to one another within the loop; and breaking the loop between the at least two nodes before breaking the loop at any other location.

In another embodiment, the method comprises: identifying at least two of a particular type of node of the plurality; and breaking the loop selectively between the at least two nodes preferentially over breaking the loop at any other location. The plurality of nodes further comprises at least one other node, and wherein breaking of the loop adjacent to the at least one other node renders at least the at least one other node inoperative.

In still another embodiment, the method comprises: identifying at least two of a particular type of node of the plurality; and breaking the loop selectively between the at least two nodes preferentially over breaking the loop at any other location; and detecting the formation of a loop within the bus. The plurality of nodes further comprises at least one node of a second type, and the operation of the at least one node would be adversely affected if the breaking of the loop is performed adjacent thereto. The selective breaking of the loop comprises not breaking the loop adjacent the at least one node so as to avoid the adverse effects.

In yet another aspect of the invention, a computerized device for use with a high-speed data bus comprising at least two nodes is disclosed. In one embodiment, the bus and nodes form a loop, and the apparatus comprises: first apparatus adapted to determine whether the at least two nodes comprise the same type of node; and second apparatus adapted to, if the determination indicates the same type of node, break the loop between any of the at least two nodes.

In still another aspect of the invention, a loop-breaking device for use with a high-speed data bus is disclosed. In one embodiment, the bus comprises a plurality of nodes comprising: (i) at least one of a first type of node being in communication with the device without any other nodes interposed there between; and (ii) at least one of a second type of node. The bus and nodes form a loop, and the device comprises computer program apparatus adapted to: detect the loop; and selectively break the loop between the device and the at least one node of the first type.

In a further aspect, a computerized device adapted for loop breaking in a high-speed serialized bus having a plurality of nodes is disclosed. In one embodiment, the device comprises: processing apparatus; and a computer program adapted to run on the processing apparatus, the computer program adapted to, when executed by the processing apparatus: identify at least two of a particular type of node of the plurality; and break the loop selectively between the at least two nodes.

In another embodiment, the high-speed serialized bus has a plurality of nodes of a first type and at least one node of a second type, and the operation of the at least one node is adversely affected by breaking the loop between the at least one node and another node immediately proximate thereto within the loop. The device comprises: processing apparatus; and a computer program, the program adapted to, when executed: identify at least two of the first type of node of the plurality that are logically adjacent to one another within the loop; and break the loop between the at least two nodes before breaking the loop at any other location.

In another embodiment, the comprises: a processing apparatus; and at least one computer program, the at least one program adapted to, when executed on the processing apparatus: identify a location within the loop and between two of the plurality of nodes where no adverse effects will result from the breaking; and break the loop between the at least two nodes preferentially over another location within the loop.

In yet another aspect, an IEEE-1394b-compliant device adapted for operation with a high-speed data bus is disclosed. In one embodiment, the bus comprises at least the device, a hybrid node, and a loop comprising a plurality of IEEE-1394a-compliant nodes, the hybrid node comprising a different type of entity than the device, and the device is in communication with the loop via the hybrid node. The device comprises computer program apparatus operative to break the bus between itself and the node.

BRIEF DESCRIPTION OF THE DRAWING FIGURES

Figure 5A:
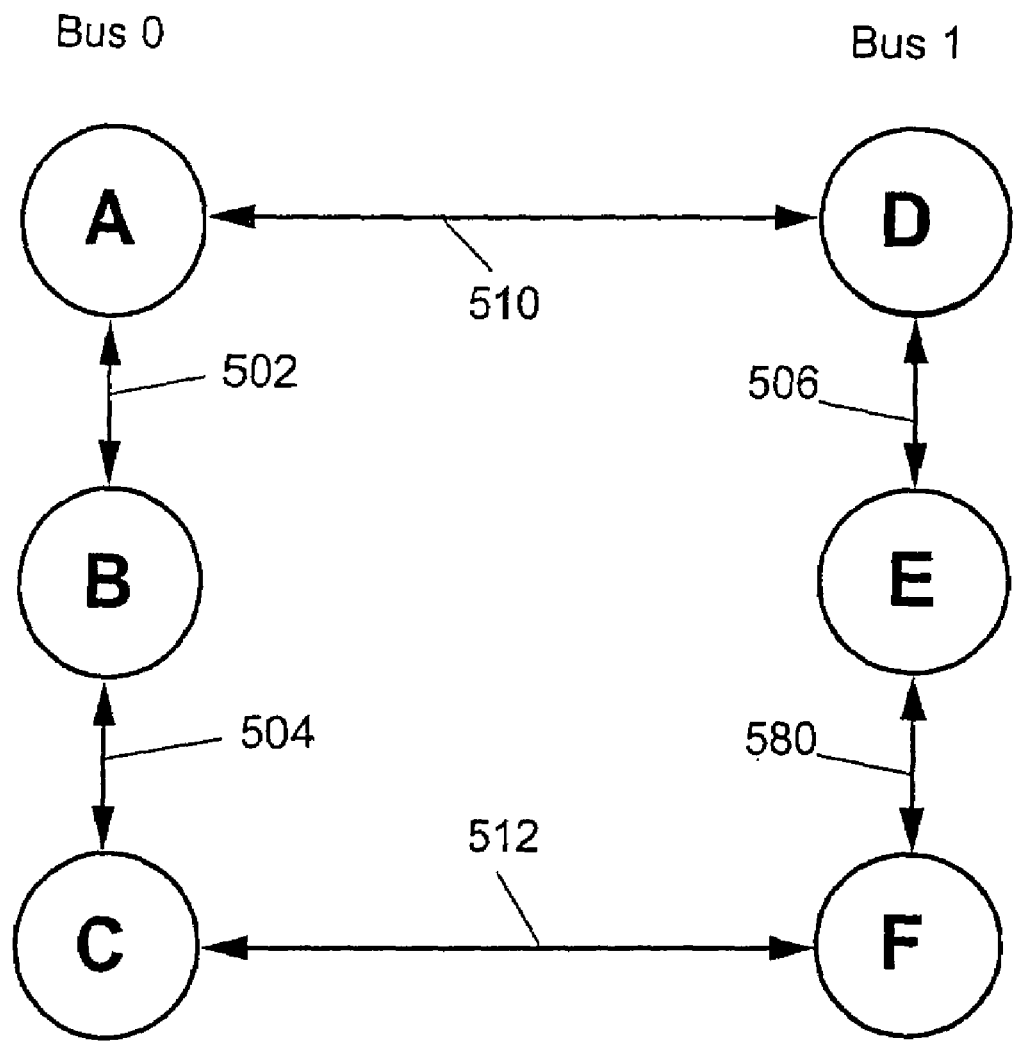
Figure 5B:
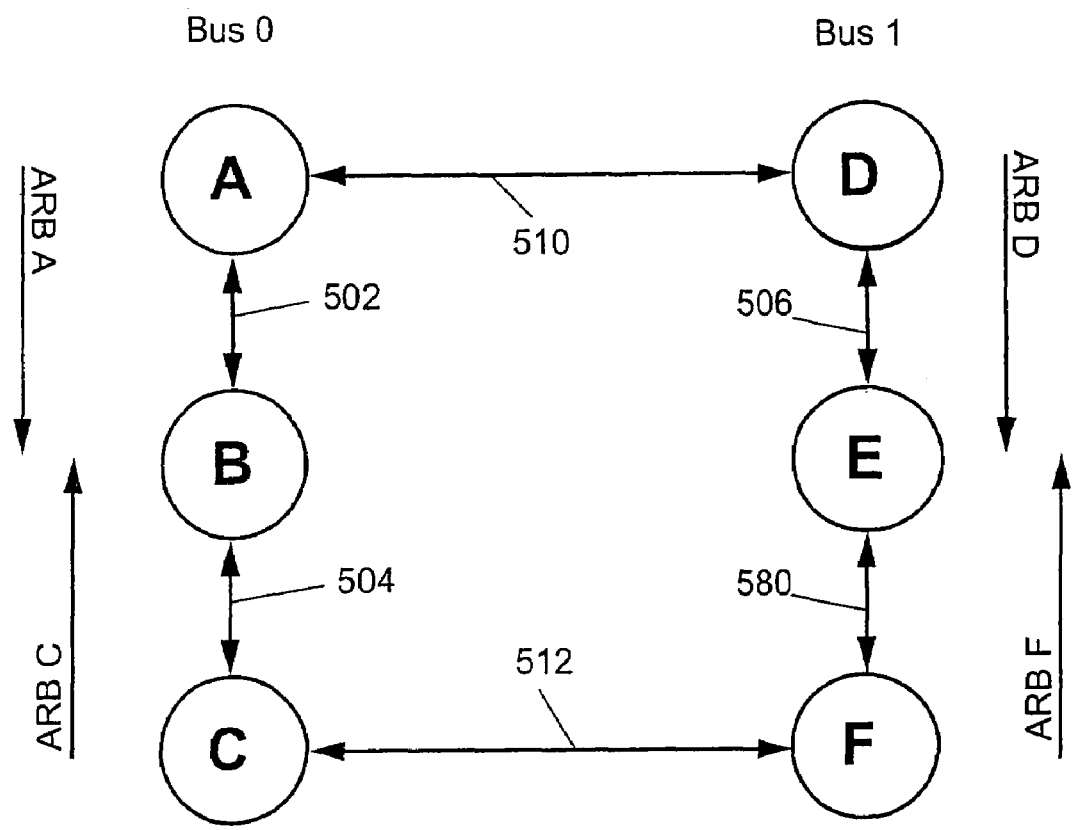
Figure 5C:
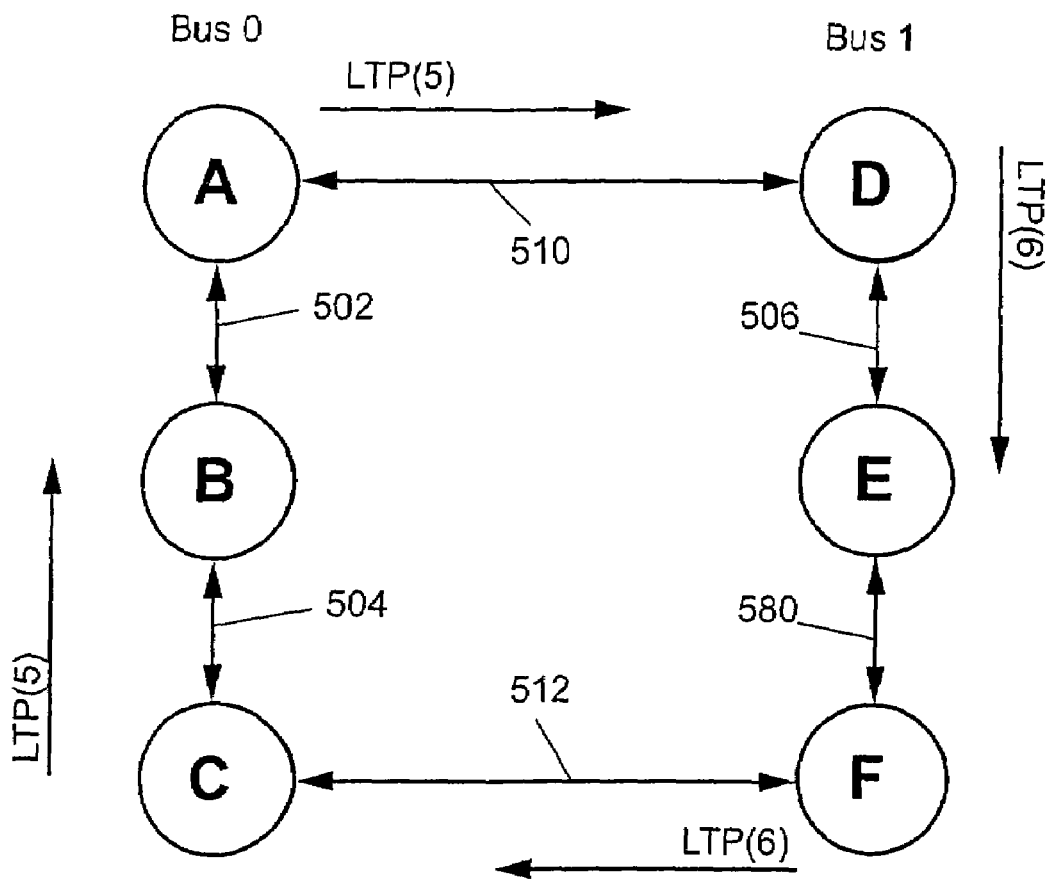
Figure 5D:
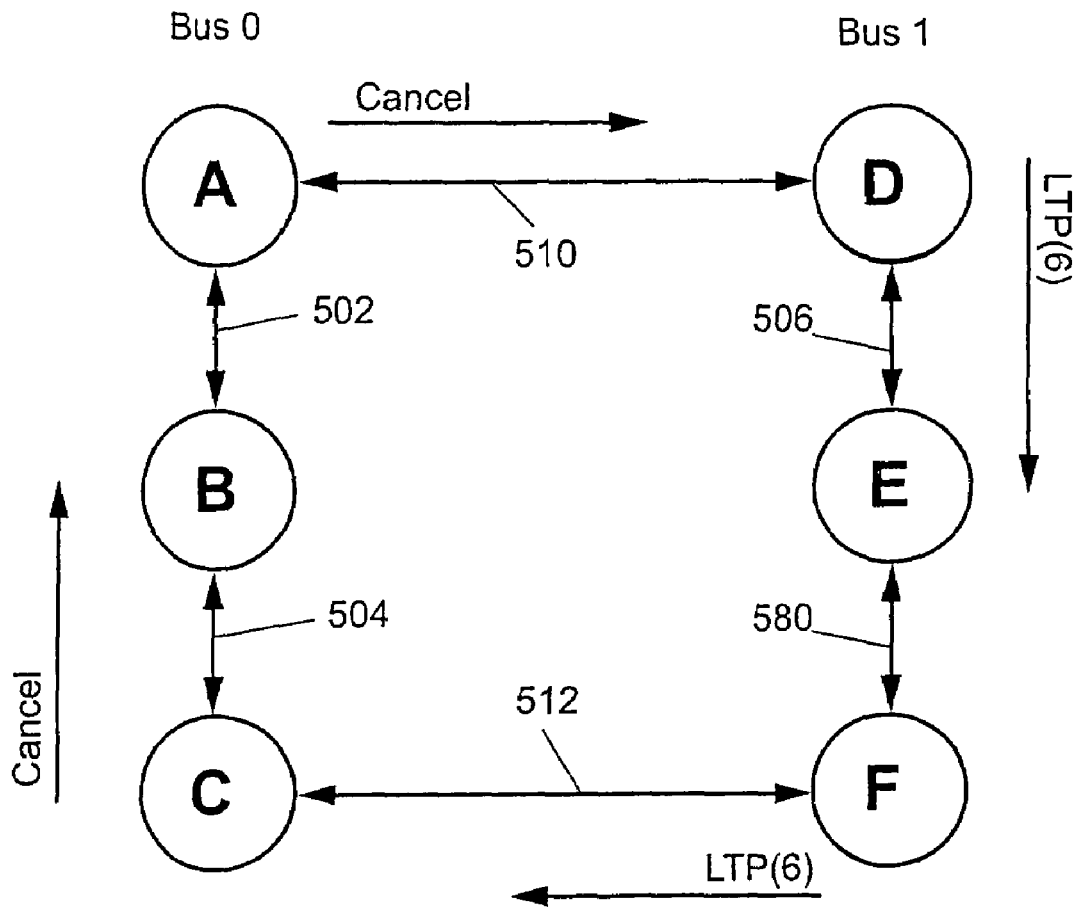
Figure 5E:
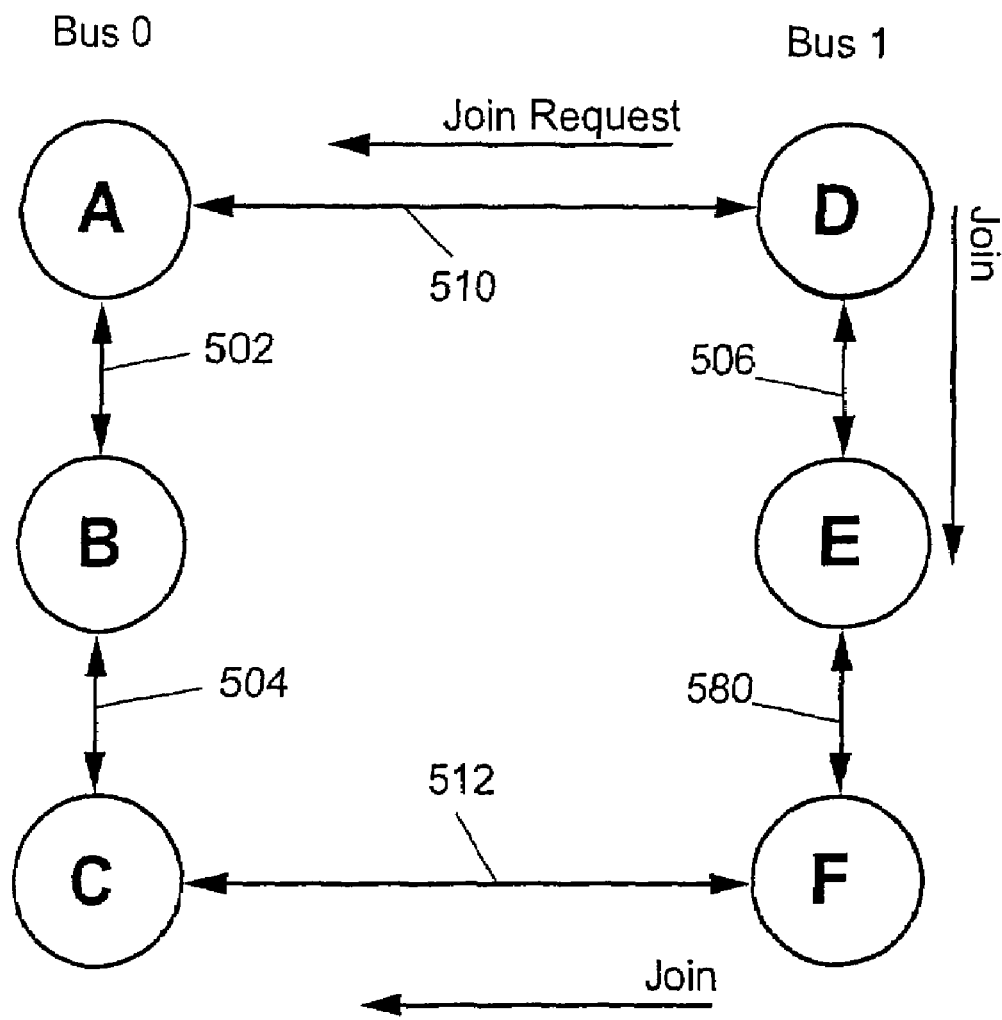
Figure 6:
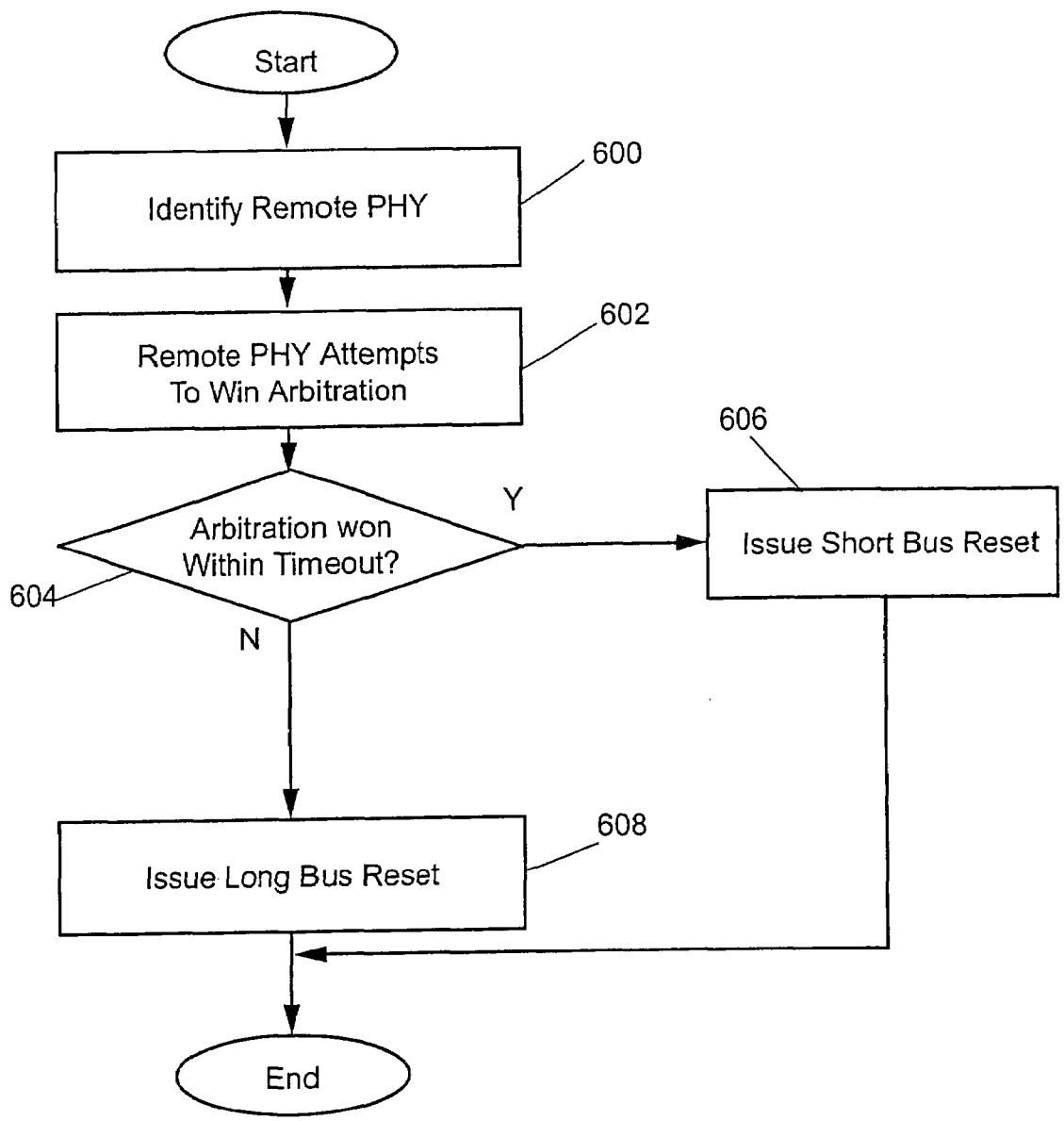
Figure 7A:
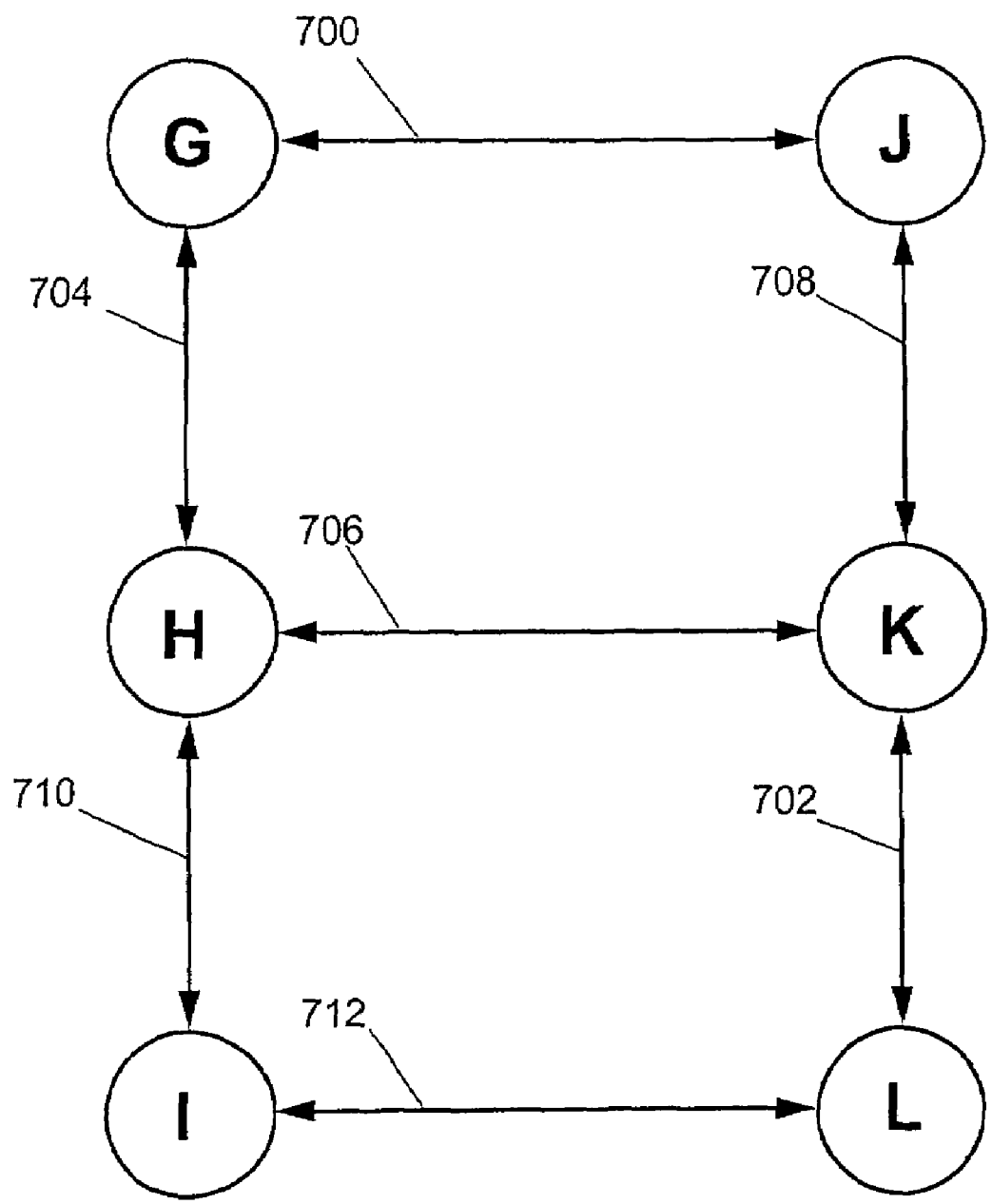
Figure 7B:
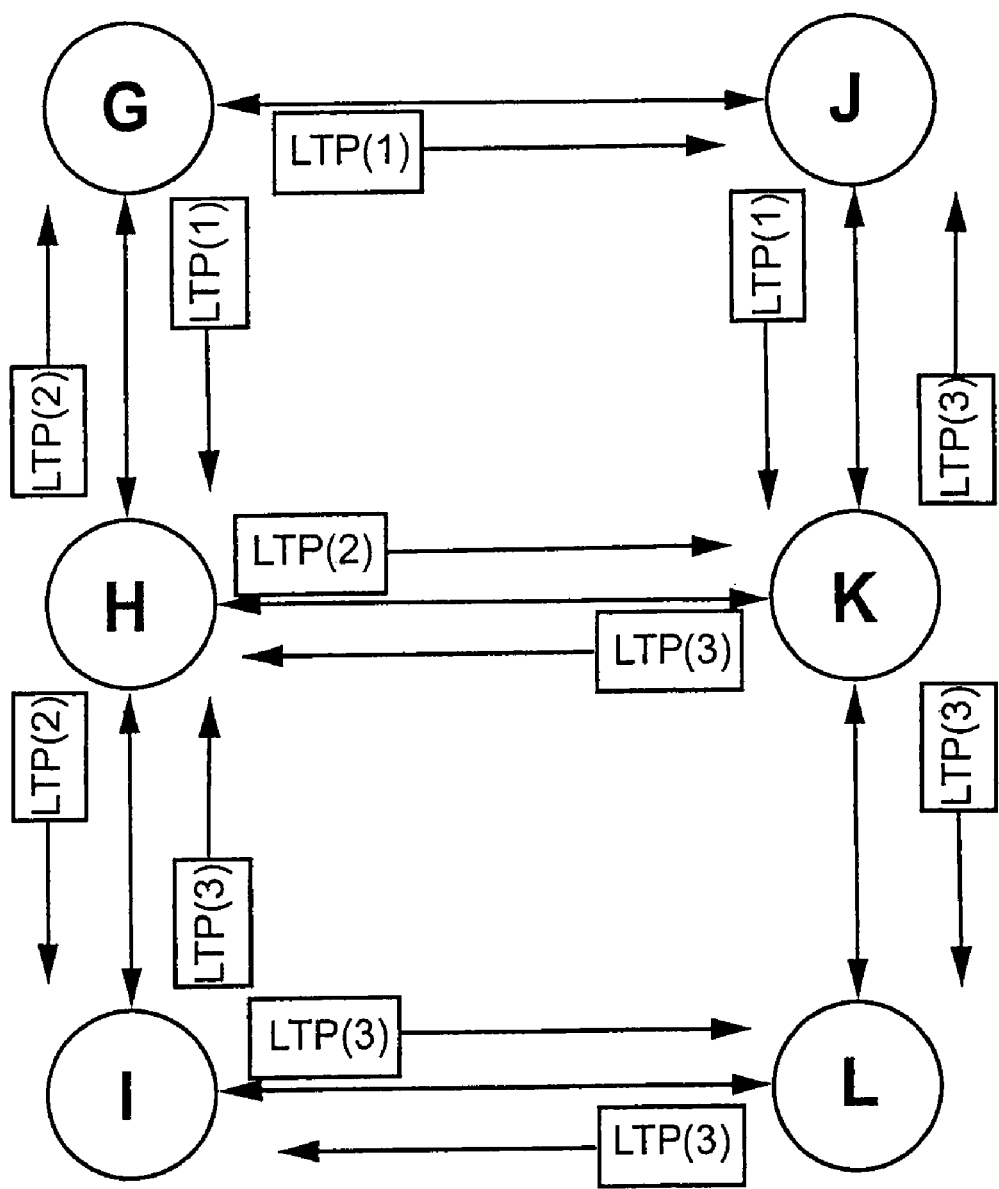
Figure 7C:
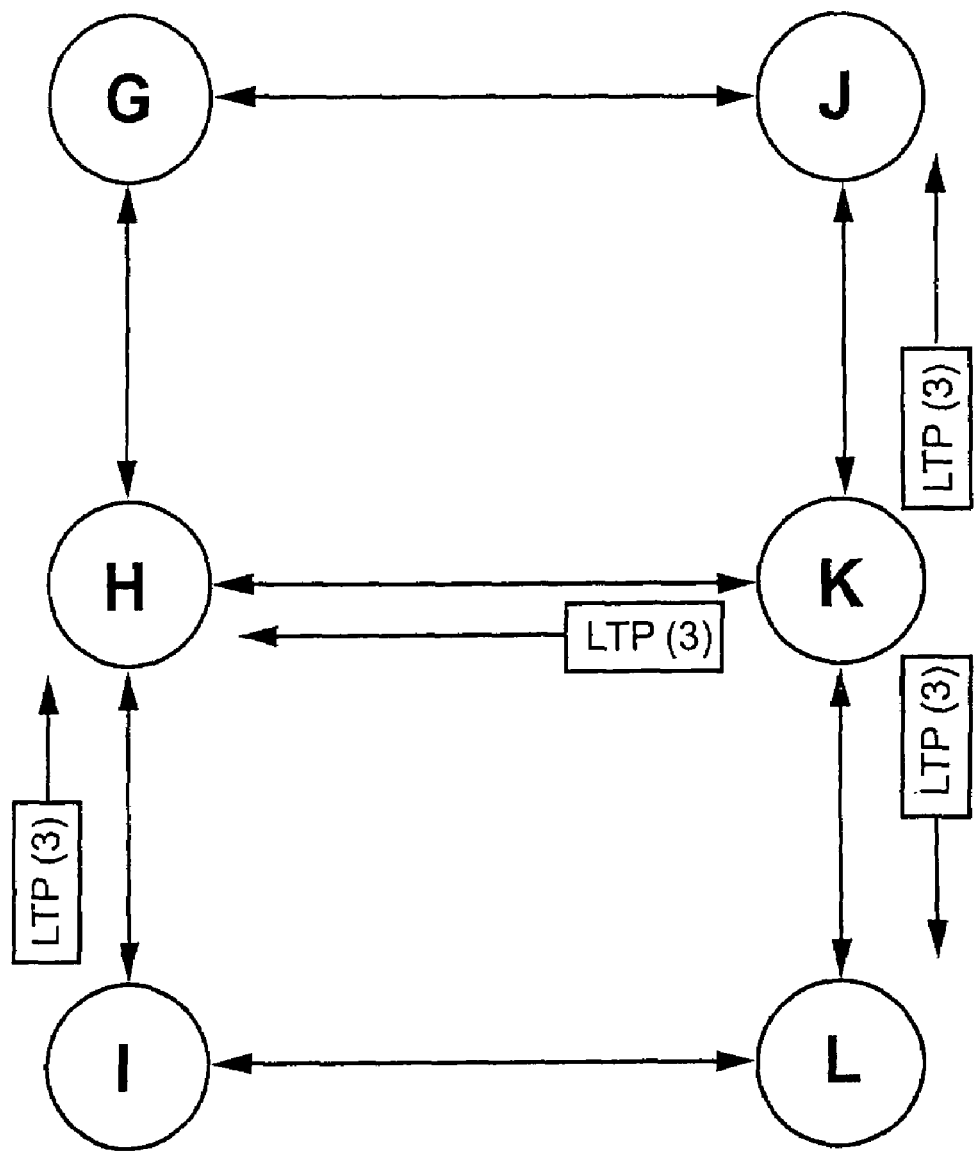
Figure 7D:
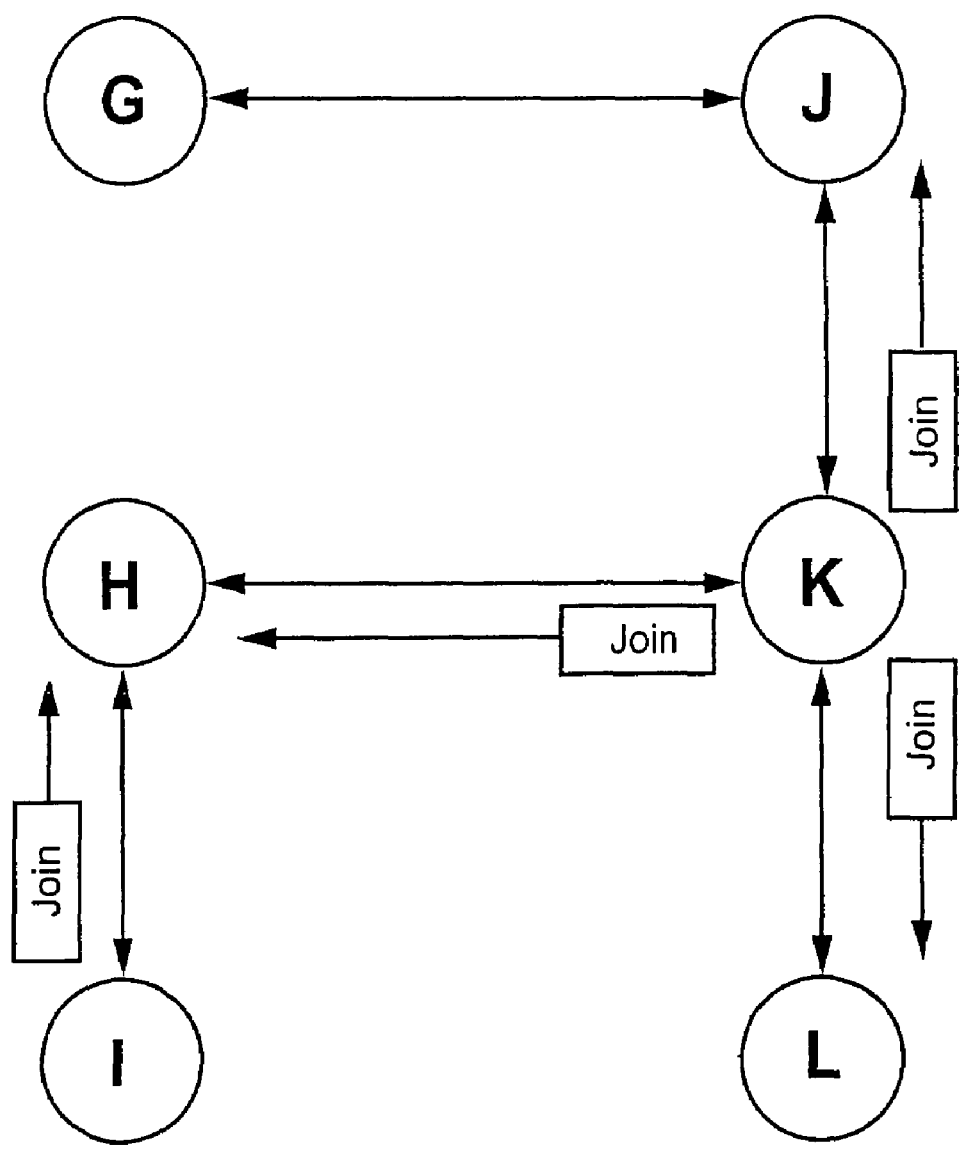
Figure 7E:
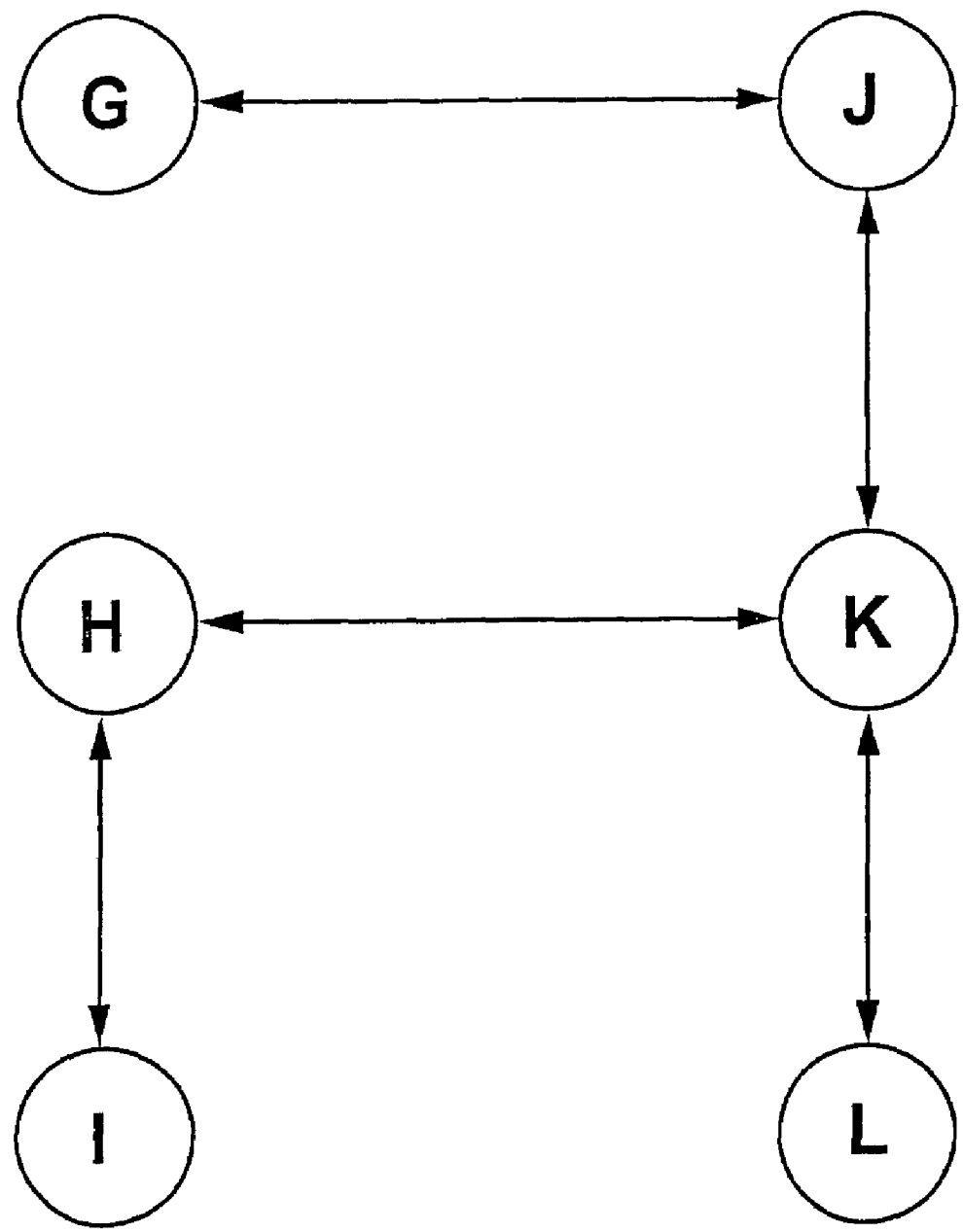
Figure 8:
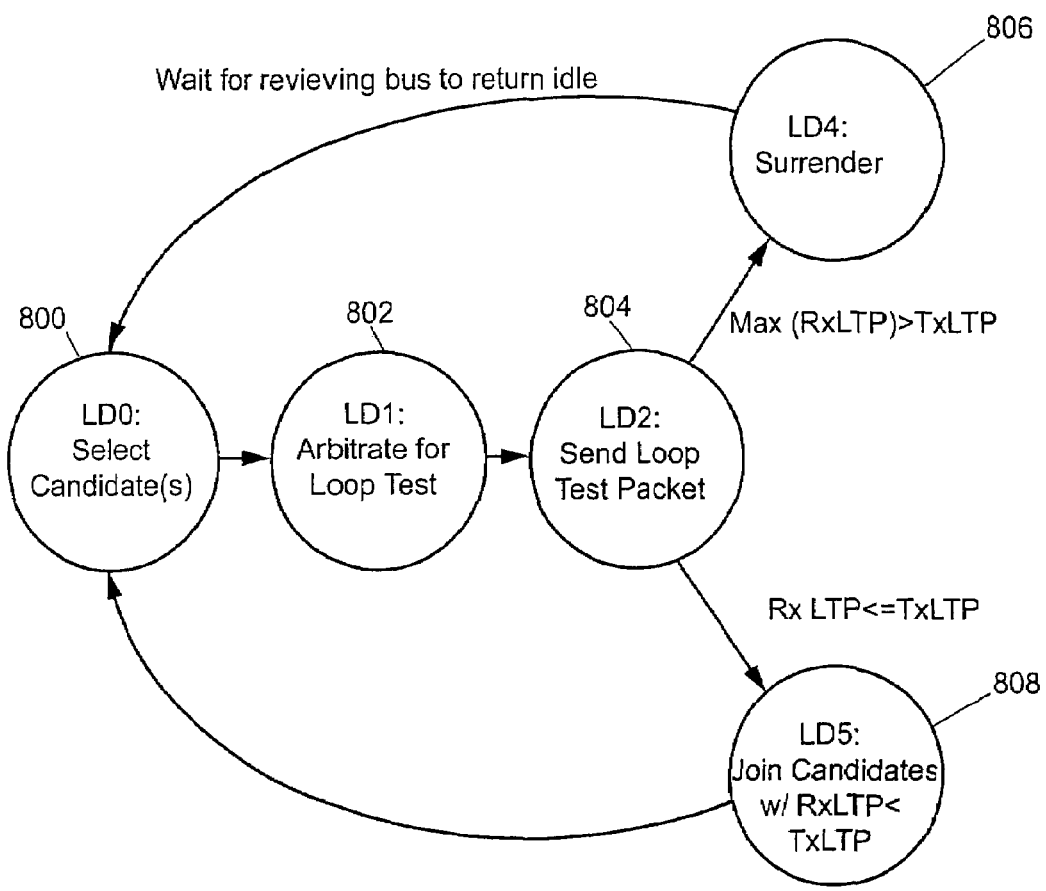
Figure 9:
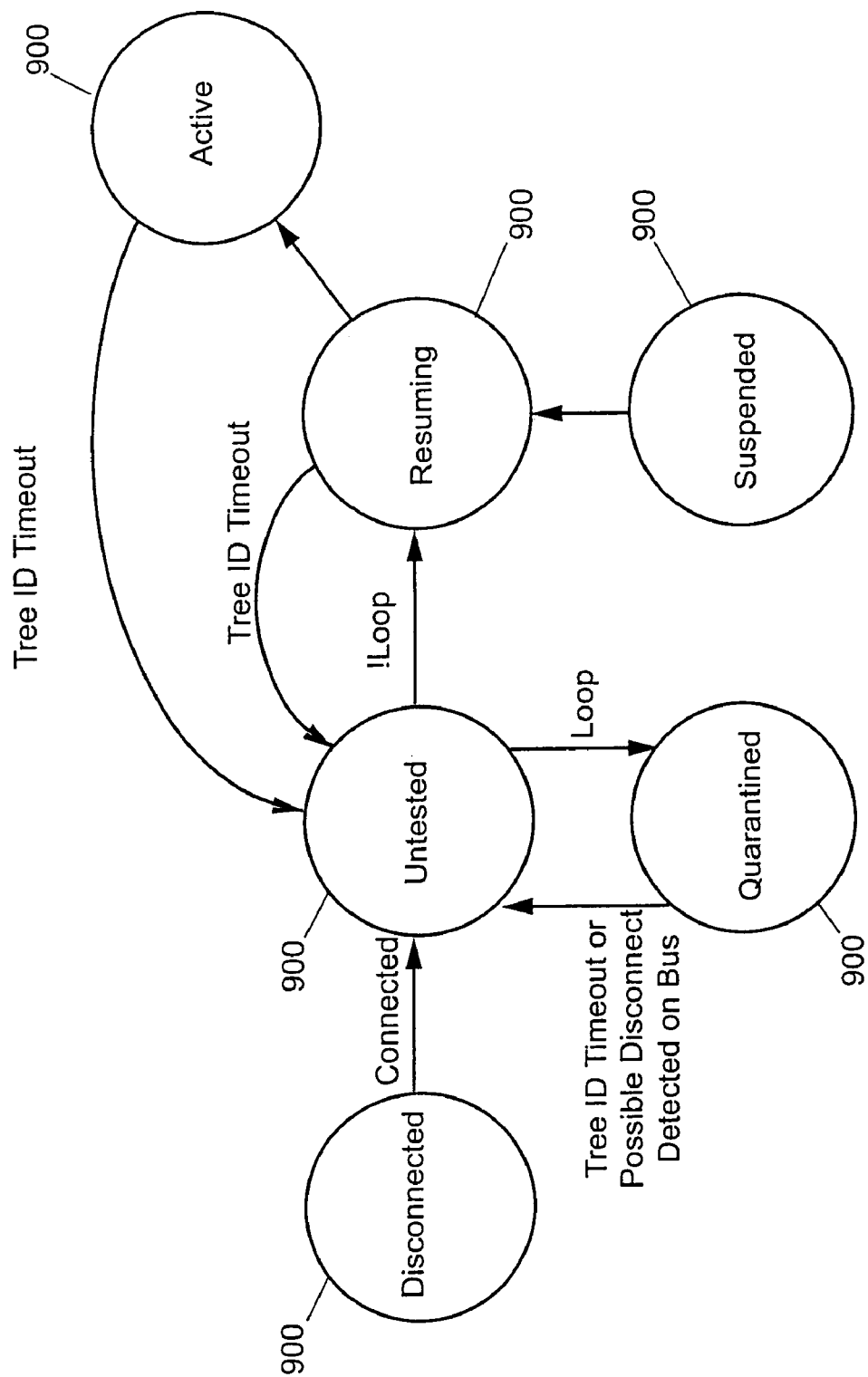

FIG. 5A is an example of an Establish Dominance process.
FIG. 5B is an example of an Establish Dominance process.
FIG. 5C is an example of an Establish Dominance process.
FIG. 5D is an example of an Establish Dominance process.
FIG. 5E is an example of an Establish Dominance process.
FIG. 6 is a flow chart of a Join Procedure.
FIG. 7A is an example of a Multiple Candidate Selection process.
FIG. 7B is an example of a Multiple Candidate Selection process.
FIG. 7C is an example of a Multiple Candidate Selection process.
FIG. 7D is an example of a Multiple Candidate Selection process.
FIG. 7E is an example of a Multiple Candidate Selection process.
FIG. 8 is state machine diagram of a possible LoopFree-Build process.
FIG. 9 is state machine diagram of a possible LoopFree-Build process.

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

The present invention relates to data communications. More particularly, the present invention relates to a method and apparatus for breaking loops on a serial bus using the P1394b standard. The invention further relates to machine readable media on which are stored embodiments of the present invention. It is contemplated that any media suitable for retrieving instructions is within the scope of the present invention. By way of example, such media may take the form of magnetic, optical, or semiconductor media.

The invention further relates to devices that embody the IEEE-P1394b standard. By way of example, such devices may include those typically used in an audio/video entertainment system, such as home theater receivers, DVD players, computers, or hand-held devices such as cameras and the like. The devices may also include those industrial in nature, such as test and measurement equipment, professional audio/video recording devices, as well as system control or robotic devices found in an industrial environment.

The invention also relates to nodes and physical computers, such as state machines. The present invention may be embodied in any collection of nodes linked together through a bus. Typically, each device connected to the bus will also have one corresponding node physical layer controller embedded therein. However, a given device may have more than one node, and therefore it follows that one device may have more than one connection to more than one bus. For the discussion that follows, the examples will show the typical situation where one node corresponds to one device.

Each node may communicate to other nodes in a P1394b-compatible system though links. Typically, a cable is used for a link, as is provided for in the IEEE-P1394b standard. However, any communication means may be employed. By way of example, an infrared, RF, or other wireless system may be used, as well as an optical system.

Typically, a link is coupled to a node through a port. A port transmits and receives messages and data between the node and link. As is known by those of ordinary skill in the art, each node may have more than one port.

In the discussion that follows, much of the lower-level detail such as ports and links will be omitted, and the discussion will focus instead on nodes. Furthermore, the discussion will focus on nodes connected to a serial bus compatible with the IEEE 1394-1995 standard. In accordance with the IEEE 1394-1995 standard, a physical node is referred to as a PHY. Therefore, in the discussion that follows PHYs that are compatible with either the IEEE 1394-1995 or the P1394a standards will be referred to as α PHYs, and PHYs compatible with the P1394b standard will be referred to as β PHYs. Finally, β nodes that must communicate with both α and β devices are referred to herein as "border" nodes.

Since the present invention requires that two nodes communicate, it is directed towards the IEEE-P1394b standard, and the advantages contained therein. However, any high-performance bus standard could be used for the present invention. For example, any standard that allows for full-duplex communication between nodes may be used.

As the IEEE-P1394b standard enters the market, it is contemplated that end users may encounter at least three potential loop scenarios: 1) a loop may be formed by all β PHYs; 2) a loop may be formed by all α PHYs; or 3) a loop may be formed by a combination of α and β PHYs. Each scenario will now be examined in turn.

Figure 1B:
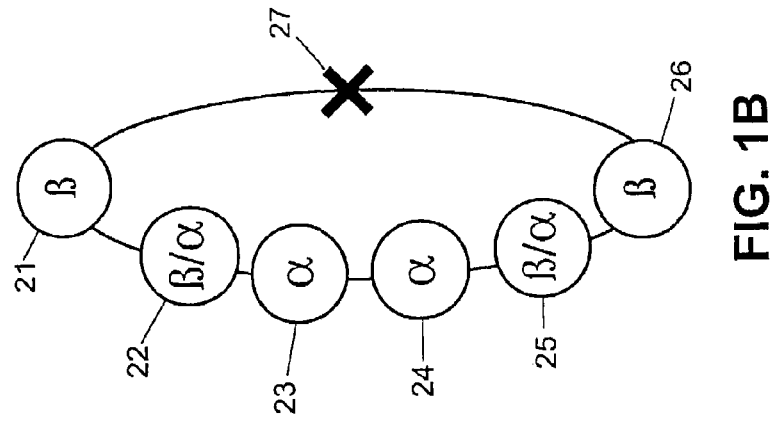
FIG. 1B is a block diagram of a hybrid loop.
Figure 1C:
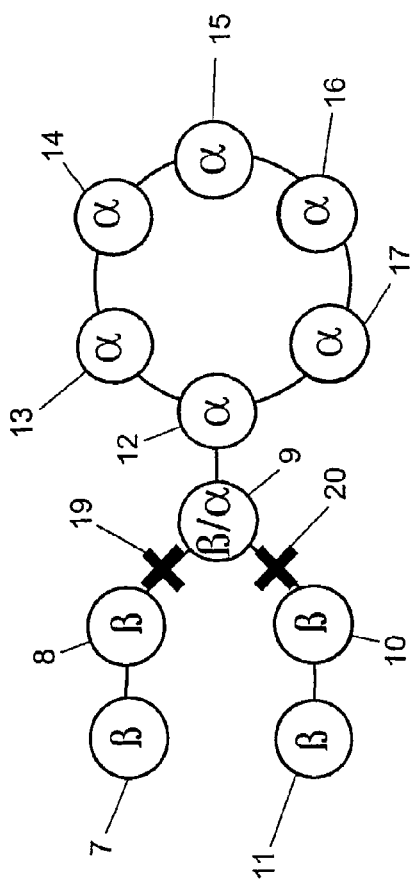
FIG. 1C is a block diagram of a pruned loop.
Figure 1A:
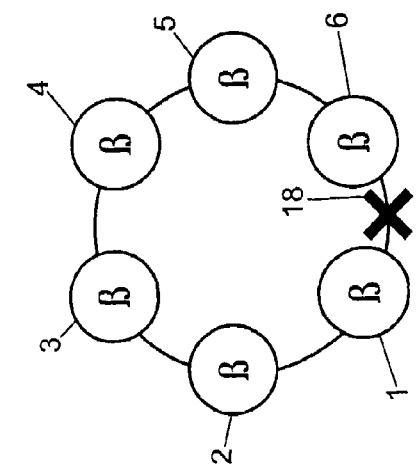
FIG. 1A is a block diagram of a pure beta loop.

Referring first to FIG. 1A, a system containing only β PHYs is shown. Each β device 1-6 represents a physical node compatible with the IEEE-P1394b standard, or a β PHY, as discussed above. FIG. 1A shows β PHYs 1-6 forming a loop which must be broken.

In a preferred embodiment of the present invention, when a loop is formed solely by β PHYs, the loop may be broken anywhere in the loop. The method and apparatus for breaking such loops will be discussed in more detail later. FIG. 1A shows the loop broken at location 18, between nodes 1 and 6. However, because the loop in FIG. 1A is made up of only β PHYs, the loop may be broken anywhere in the loop by a pair of β PHYs.

FIG. 1B shows a system containing both α and β PHYs. In a preferred embodiment of the present invention, when a loop contains both α and β PHYs, the loop-breaking algorithm will be optimized to insure that the loop will be broken between two β devices. Therefore, when breaking loops containing both α and β PHYs, operation of α PHYs will not be effected.

FIG. 1B shows β PHYs 21 and 26, α/β border nodes 22 and 25, and α PHYs 23 and 24. Since it is preferable in accordance with the present invention to break loops between two β PHYs, the present invention could break loop at location 27, between β PHYs 21 and 26, thus leaving the α PHYs unaffected.

FIG. 1C shows a situation where an α loop must be completely pruned from the bus. In FIG. 1C, β PHYs 7, 8, 10, and 11 are joined through hybrid PHY 9 to a loop completely formed by α PHYs 12, 13, 14, 15, 16 and 17. As is known by those of ordinary skill in the art, the loop formed by the α devices will render the bus inoperable. Because α PHYs cannot break loops themselves, the present invention will instead break the loop near β PHYs 8 and 10 by severing the loop at locations 19 and 20, respectively. This effectively "prunes" the α PHY loop from the bus, and recovers operation of the bus by creating two separate operational buses consisting of β devices 7 and 8, and β devices 10 and 11.

Figure 2:
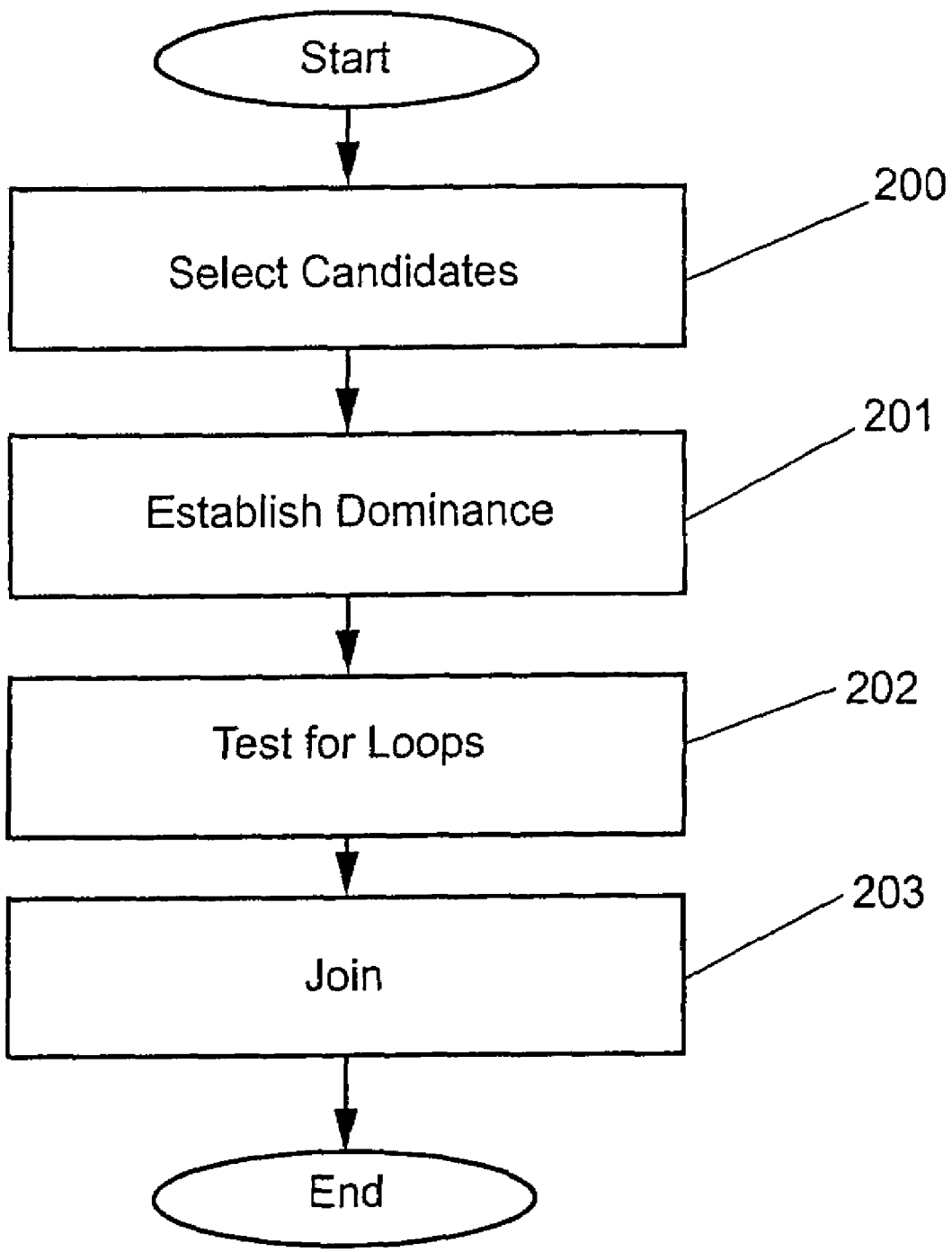
FIG. 2 is a block diagram of a "LoopFreeBuild".

Referring now to FIG. 2, a block diagram of an overview of the present invention is shown. FIG. 2 shows the four basic acts for building a loop-free bus which comprise a presently preferred embodiment of the present invention: Act 200, Select Candidate(s), determine which untested connection(s) should be processed; Act 201, Establish Dominance, assert temporary exclusive right to activate-candidate connection(s); Act 202, Test for Loop, test whether candidate connection(s) would form a loop if enabled; and Act 203, Join, activate candidate connection(s) which tested "loop free".

The acts shown in FIG. 2 comprise the essential elements of what the inventors term a "LoopFreeBuild", that is, building a system free from loops. In practice, however, two fundamentally different approaches to LoopFreeBuild have been explored. The first situation is where only one new, or "candidate", connection has presented itself to the bus for joining. The second situation is where multiple candidates are presented to the bus for joining at the same time. Each will now be taken in turn.

Single Candidate LoopFreeBuild

Selection of Candidates

Figure 3:
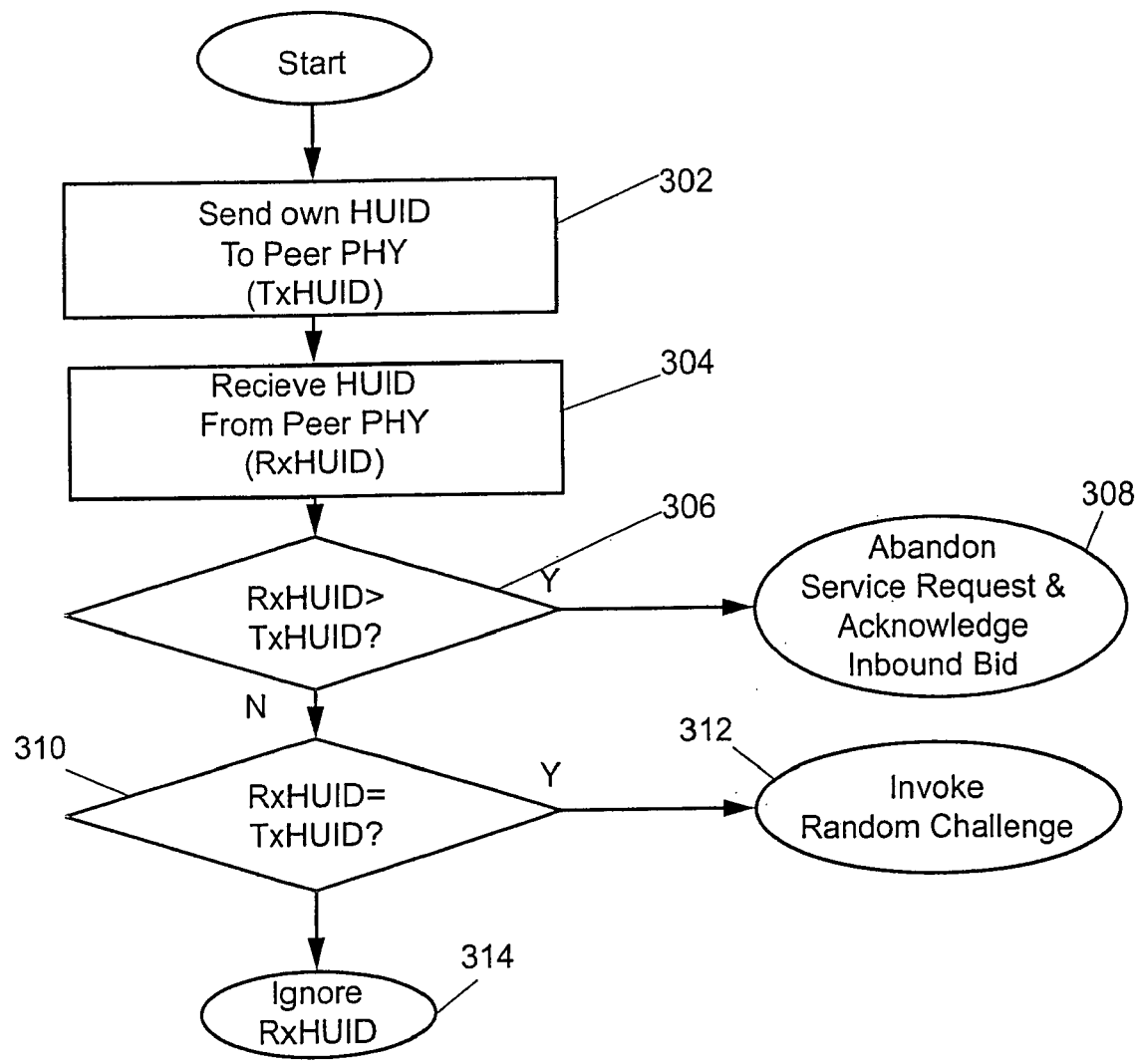
FIG. 3 is a block diagram of a Single Candidate Selection process.

FIG. 3 is a flow chart showing the Single Candidate Selection process. Starting at act 302, the candidate PHY transmits a HUID (hereinafter a TxHUID) to the peer PHY; and in act 304, the PHY receives a HUID (hereinafter a RxHUID) from the peer PHY. In decision act 304, the RxHUID is compared with the TxHUID. If the RxHUID is greater than the RxHUID, than the process proceeds to act 308, where the candidate PHY abandons its outbound ServiceRequest, and acknowledges the incoming bid, thereby ending its bid. If the RxHUID is not greater than the TxHUID, than the process moves to decision act 310.

In decision act 310, if the RxHUID is equal to the TxHUID, than the PHY will invoke a random challenge in act 312. If the RxHUID is not equal to the TxHUID, than by definition the TxHUID is greater than the RxHUID, and the process will move to the Establish Dominance and Test for Loops process.

FIGS. 4A-4F show an example how this is accomplished in a preferred embodiment of the present invention.

Figure 4A:
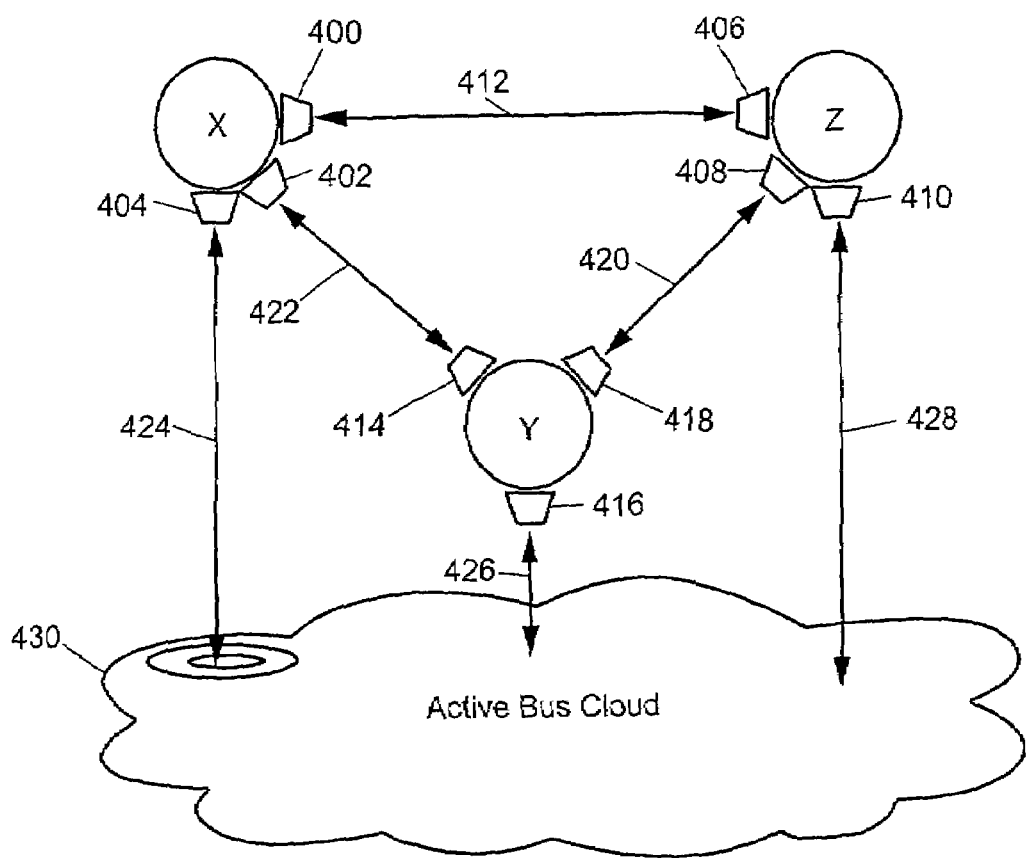
FIG. 4A is an example of a Single Candidate Selection process.

FIG. 4A shows three PHYs X, Y, and Z. PHY X is shown having three ports 400, 402, and 404. PHY Z is shown having three ports 406, 408, and 410. PHY Y is shown having three ports 414, 416, and 418.

PHY X, through port 400, has an untested connection 412 to PHY Z through port 406. PHY X, through port 402, has an untested connection 422 to PHY Y through port 414. Finally, PHY Y, through port 418, has an untested connection 420 to PHY Z through port 408. An untested connection is one that has achieved connectivity but has not yet been tested for loops. This state may occur for any number reasons; by way of example, PHYs X and Z may all be connected by a user at the same time or may be powered up simultaneously.

PHY X has a qualified connection 424 through port 404 to an existing bus, shown herein as bus cloud 430. Likewise, PHY Y has a qualified connection 426 through port 416 to bus cloud 430, and PHY Z has a qualified connection 428 through port 410 to bus cloud 430.

In a preferred embodiment of the present invention, in order for a candidate connection to be tested and joined, peer PHY ports at the opposing ends of the candidate connection must agree to service the connection at a given instant.

Figure 4B:
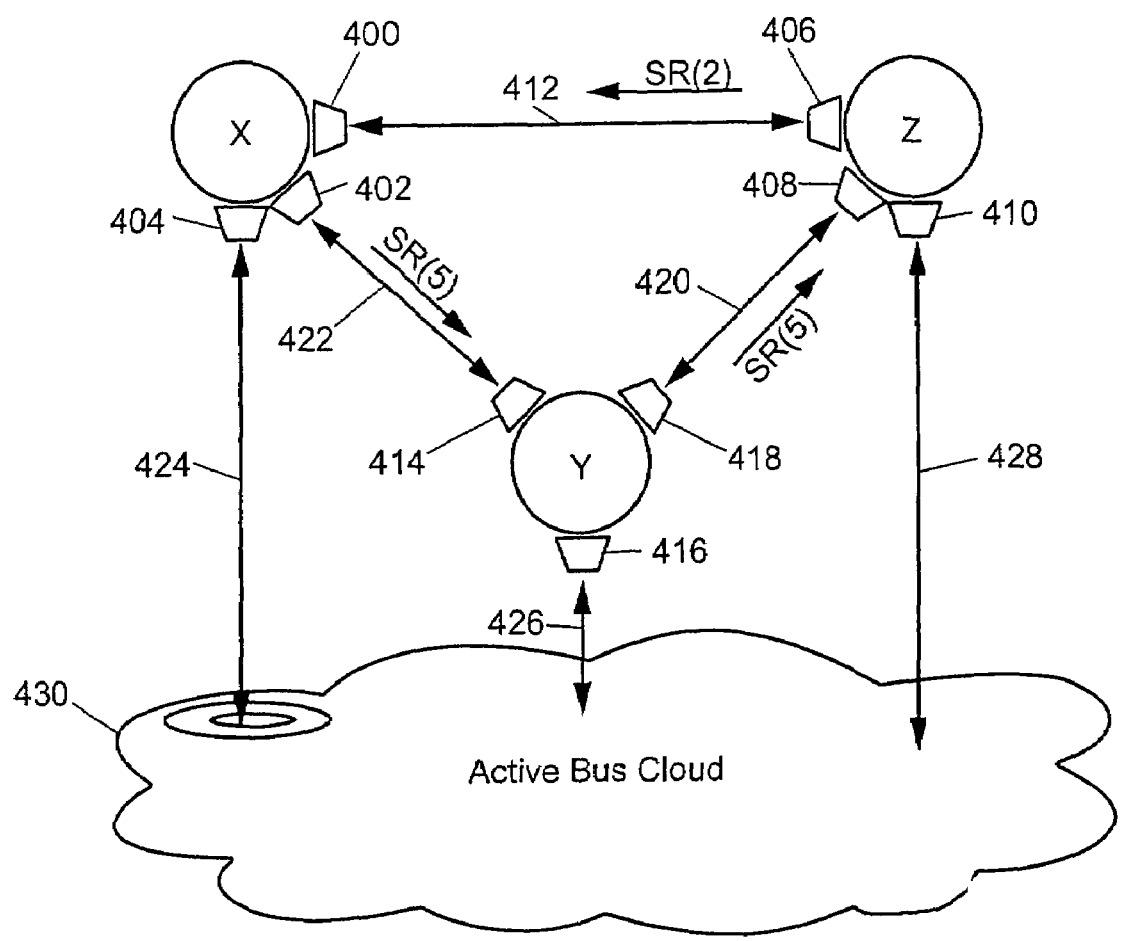
FIG. 4B is an example of a Single Candidate Selection process.

FIG. 4B shows PHYs X, Y, and Z beginning to communicate with each other. To establish the necessary cooperation, a given PHY attempts to gain the attention of a neighboring PHY by sending a ServiceRequest symbol across a single chosen untested connection. In effect, the ServiceRequest says to a neighboring PHY "I would like to have your attention, please." As is appreciated by those of ordinary skill in the art, challenges must be asserted long enough to ensure that all candidate PHYs have heard the challenge.

Within the ServicePacket, each PHY X, Y, and Z includes a Hopefully Unique Identifier number (HUID). A HUID is created by a random number generator within each PHY. In general, whoever has the highest HUID will establish dominance. In FIG. 3B, PHY Z sends a ServiceRequest symbol containing a HUID of 2 to PHY X, PHY Y sends a ServiceRequest symbol containing a HUID of 5 to PHY Z, and PHY X sends a ServiceRequest symbol containing a HUID of 5 to PHY Y.

For the purposes of this embodiment, when a PHY generates a HUID, it stores a copy internally. All PHYs listen on untested connections for an inbound ServiceRequest. When it receives a neighbor's HUID, the PHY then compares the received HUID with the HUID generated and stored internally. If the received HUID is greater than the PHYs own HUID, the PHY then cancels its bid to join the bus by abandoning its outbound ServiceRequest and acknowledging the inbound bid. If an equivalent HUID is received, a probalistically seeded back off or random challenge is invoked.

Figure 4C:
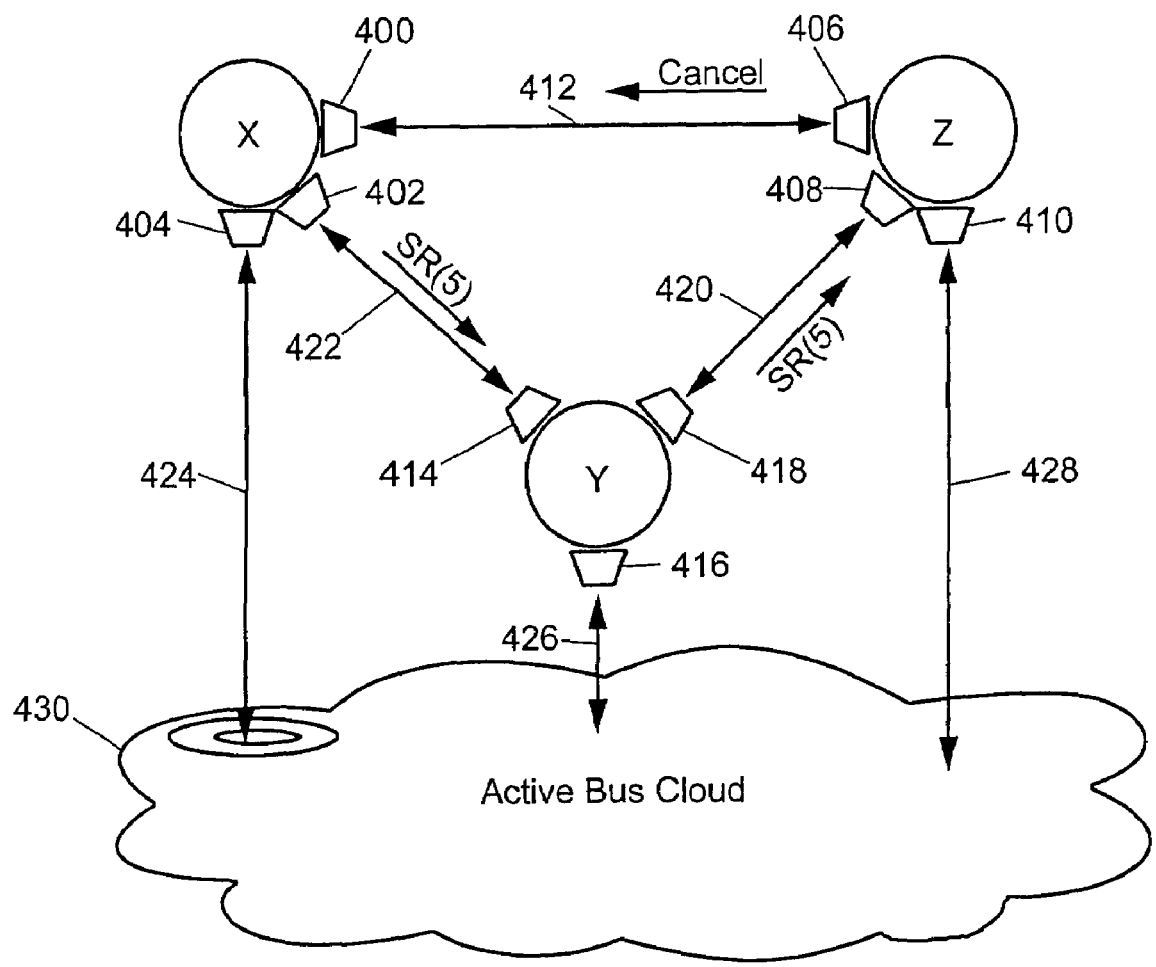
FIG. 4C is an example of a Single Candidate Selection process.
Figure 4D:
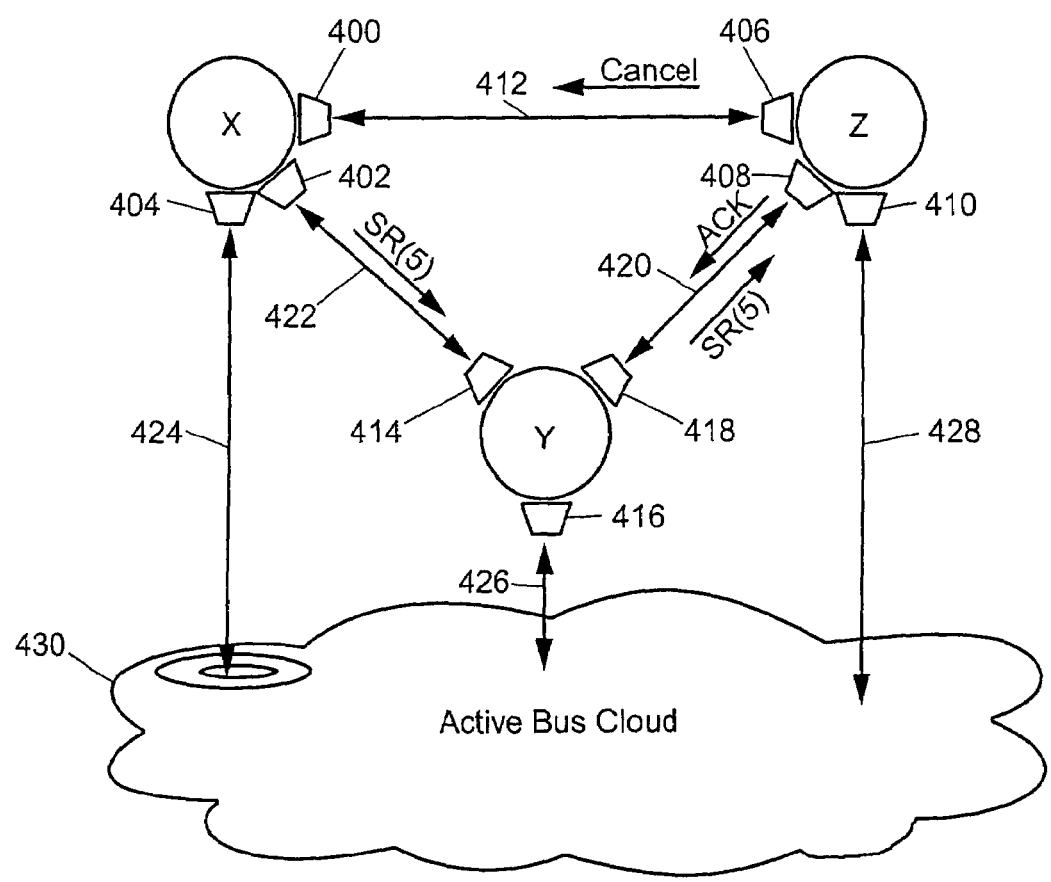
FIG. 4D is an example of a Single Candidate Selection process.

FIG. 4C shows this procedure in action. Since PHY Z sent an outbound HUID of 2, and it received an inbound HUID of 5, PHY Z is shown dropping its bid by canceling its outbound ServiceRequest to PHY X. FIG. 4D shows PHY Z acknowledging PHY Y's inbound ServiceRequest by sending an acknowledgement, or ACK. At the same time PHY X is continuing to send another challenge to PHY Y.

Figure 4E:
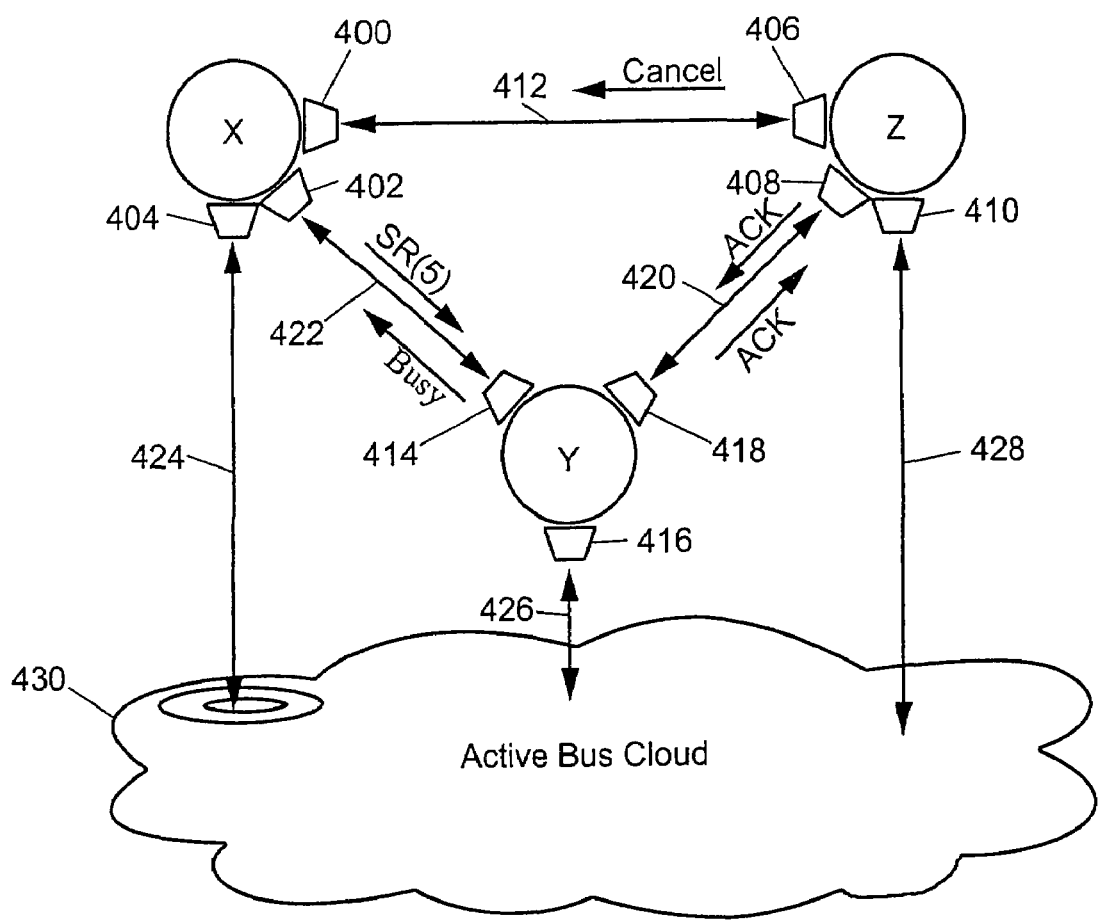
FIG. 4E is an example of a Single Candidate Selection process.

The process continues in FIG. 4E. The presence of an acknowledgement from PHY Z allows PHY Y to acknowledge PHY Z, and send a Busy signal to PHY X. A Busy signal indicates the recipient that the sender will not entertain any more challenges for the present cycle.

Figure 4F:
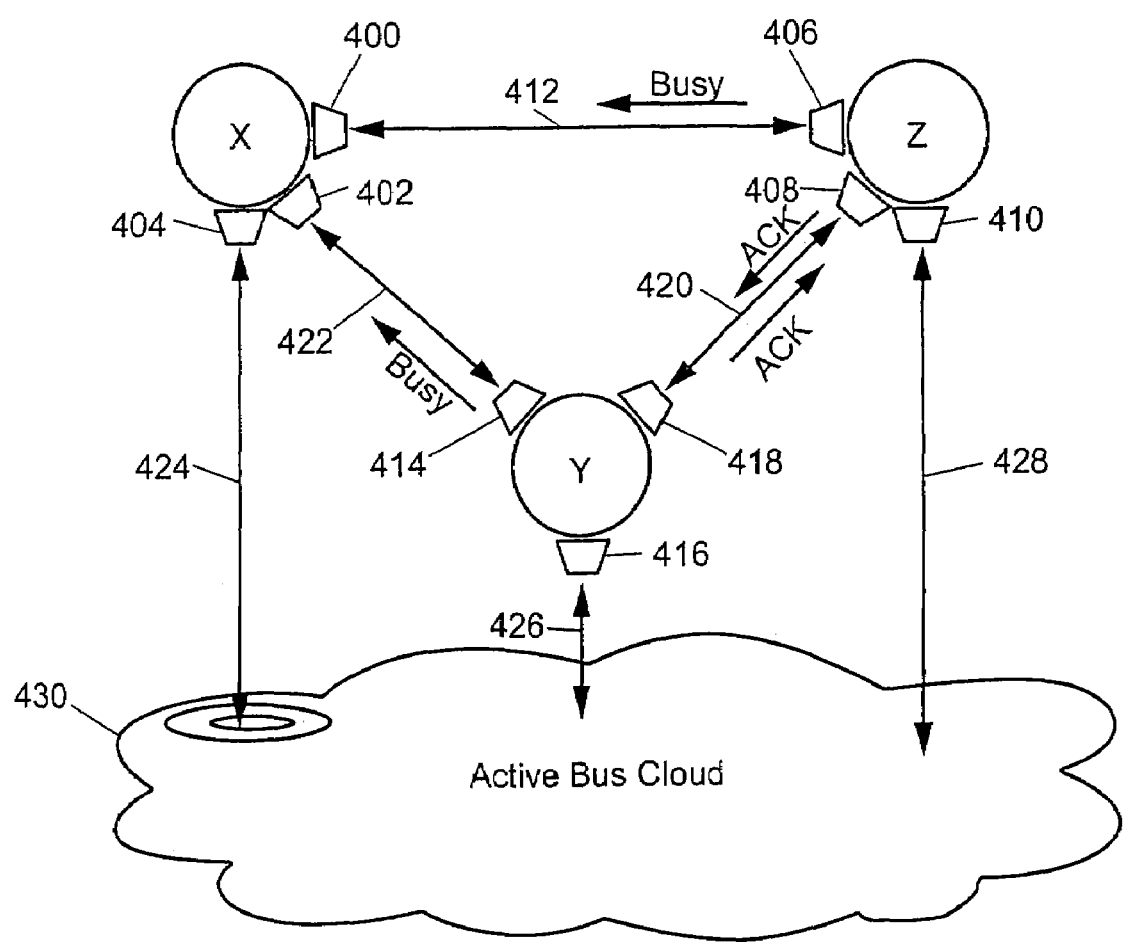
FIG. 4F is an example of a Single Candidate Selection process.

In FIG. 4F, PHY Z, upon seeing PHY Y's acknowledgement, busies PHY X as well. As a result, PHYs Y and Z have now selected each other to continue and test the link. As is appreciated by those of ordinary skill in the art, the result of this process is that a methodical and systematic method has been demonstrated which allows multiple candidates for connection to be narrowed down to two candidates.

Establish Dominance and Test for Loops

As is appreciated by those of ordinary skill in the art, it is essential that only one candidate pair be testing for loops at any one time. The Establish Dominance act ensures this occurs by forcing a PHY that to arbitrate for control of the bus before joining.

In practice, the next two acts of establishing dominance and testing for loops are performed simultaneously. FIGS. 4A-4F show these acts in action.

FIG. 5A shows two buses, Bus 0 and Bus 1. Bus 0 has PHYs A, B, and C connected with pre-existing links 502 and 504, respectively; and Bus 1 has PHYs D, E, and F connected with preexisting links 506 and 508, respectively. In FIG. 5A, PHYs A and D would like to join through link 510, and PHYs C and F would like to join through link 512. In a presently preferred embodiment, this selection occurred as a result of the Single Candidate Selection process as just described. As is appreciated by those of ordinary skill in the art, if PHYs A and D were allowed to join simultaneously with PHYs C and F, a loop would form.

To prevent this, in a preferred embodiment of the present invention, ports on the candidate connection arbitrate for control of their respective buses. In practice, isolated PHYs wait a bit longer to begin arbitration to help reduce the need for long bus resets when joining.

FIG. 5B shows all four PHYs arbitrating for their respective buses, that is, PHYs A and C are arbitrating for control of Bus 0, and PHYs D and F are arbitrating for control of Bus 1.

In a preferred embodiment of the present invention, this arbitration takes place in accordance with the IEEE-P1394b standard.

FIG. 5C shows that in this example, it will be assumed that PHYs D and C win arbitration. In accordance with a preferred embodiment of the present invention, PHYs C and D has established themselves as dominant, and can begin transmitting their Loop Test Packet (LTP) on the main bus.

FIG. 5C shows PHY A privately reporting any LTP it receives to PHY D, and PHY F privately reports any LTP it receives to PHY C. This private reporting ensures that the LTP sent by PHY C is heard by PHY D, and visa versa, thus allowing dominance to be established.

Next, FIG. 5D shows the HUID comparison process in action. The peer port is instructed to listen for any LTP and communicate any received HUID back to the local port. If an LTP is received with a higher HUID, the local PHY drops transmission of the LTP and will retry after a bus reset or the peer PHY reports the absence of a received LTP. A lower received HUID, or no received LTP, establishes the local PHY as dominant. An equivalent received HUID causes a pseudo-random back-off sequence.

A loop is detected if a port must try a specified number of tries unsuccessfully. If a port reaches a predetermined number of tries, a loop is presumed to exist and the PHY moves on to the next untested port. In a presently preferred embodiment of the present invention, a preset limit of four or five tries has proved satisfactorily.

As a result of the above process, FIG. 5D shows PHY C withdrawing its LTP given the lower HUID.

As can be appreciated by those of ordinary skill in the art, many different schemes can be employed within a HUID. By way of example, one could encode the HUID with a code which weighted the numerical value with factors such as port speed or location. This would allow the faster ports to join sooner. Also, if one desired a certain device to always join, one could program a Guaranteed Unique Identifier, or a GUID. In one preferred embodiment, the GUID may be formed by allocating the most significant bits to the GUID, or zeros if one not available, and the least significant bits to a random number.

FIG. 5E shows PHY D recognizing that it has established dominance and not found a loop. Therefore, PHY D begins the join process with PHY A by sending a Joining Request privately on Bus 1.

Meanwhile, PHY broadcasts its join intent on Bus 1. In a presently preferred embodiment, the Join Message is encoded to be higher than any HUID. This ensures that PHYs which may join late will lose to a Join Request in a HUID contest. In a preferred embodiment, it is specified that an LTP is sent for a minimum amount of time equal to a subaction gap before dominance can be determined to allow for late-comers.

Additional Methods for Establishing Dominance

As was explained above, one of the main goals of the Establish Dominance act was to have one of the pair of candidate nodes establish control of its local bus. However, there may be situations were it is more desirable for one rather than the other candidate to establish control of its bus. For example, if one candidate node already has a pre-existing connection, and the other candidate node has no connections, then it is preferred that the connected node establish dominance rather than the unconnected, or remote node, thereby avoiding long bus resets.

It is contemplated that there are many ways to embody this preference. For example, in one preferred embodiment, the indicator that indicates whether the source node has a pre-existing connection may be included along with the HUID. In another preferred embodiment, the node itself may be programmed to determine its own connection status and behave accordingly when communicating with other nodes so programmed. In another preferred embodiment, the node determines whether it has pre-existing connections. If it does, the node will immediately move to establish dominance. It the node has no connections, then the node will wait a pre-determined amount of time before moving to establish dominance.

Join

The final act in the LoopFreeBuild process is the join. Once a connection has been tested and found loop-free through the above acts, it can be joined.

The join process comprises four acts as shown in the flow-chart in FIG. 6. In a presently preferred embodiment, the following acts are taken to reduce the risk of bus resets.

In act 600, remote PHYs are identified and are asked to join. In act 602, the remote PHY identified in act 600 attempts to win arbitration.

As is known by those of ordinary skill in the art, the timing of the arbitration act is critical. In a preferred embodiment of the present invention, if arbitration sought in acts 600 and 602 is won within the time period of a maximum-sized asynchronous packet, query 604 will result in a short bus reset being issued to both buses in act 606. As is known by those of ordinary skill in the art, a short bus reset is advantageous because there is minimum impact to the operation of devices connected to the bus.

If arbitration is not won within the specified timeout, the decision of act 63 will result in a long bus reset is issued in act 608.

Single Candidate Advantages

As can be appreciated by those of ordinary skill in the art, the single candidate process has certain advantages. For example, there will be a lower occurrence of long bus resets since only a maximum of two arbitration domains have to line up at a time. The single candidate process is easier to weight towards high speed connections coming up first through the use of weighted HUIDs or GUIDs. Furthermore, in a single candidate process, it may be simpler to validate and ensure that loops will not be formed. In other words, the LoopFreeBuild process is more reliable in the single candidate scenario. Finally, in a single candidate process, remote PHYs only need to be listened to on one untested port at a time.

Multiple Candidate

The discussion will now turn to the LoopFreeBuild multiple candidate case, where at any instant in time, any number of candidate connections to a given bus are selected for testing and joining.

Selection of Candidates

The selection of candidates is simplified in the multiple candidate case. Here, each local PHY selects all untested ports as candidates; there is no selection procedure as in the single candidate case.

Establish Dominance and Test for Loops

As with the single candidate LoopFreeBuild process, the acts of establishing dominance and testing for loops are combined. FIGS. 7A-7E show the multiple candidate process.

Referring now to FIG. 7A, PHYs G, H, I, J, K, and L are presented for joining. In FIG. 7A, PHYs G and J have a qualified connection 700, and PHYs K and L have a qualified connection 702.

In FIG. 7A, PHYs G and H have an untested connection 704, PHYs H and K have an untested connection 706, PHYs J and K have an untested connection 708, PHYs H and I have an untested connection 710, and PHYs I and L have an untested connection 712.

In a multiple candidate case, each PHY with untested ports arbitrates for its active bus. In practice, isolated PHYs wait a bit longer to begin arbitration to help reduce the need for long bus resets when joining.

Referring now to FIG. 7B, after winning arbitration, a Loop Test Packet (LTP) containing a HUID is transmitted on the bus, and a Loop Test Symbol (LTS) is sent through any untested ports. At all times, untested ports transmit the last HUID seen in a LTP to their respective peer ports as an LTS. Likewise, they receive HUIDs from their peers within an LTS. In FIG. 7B, PHY G transmits a LTP with a HUID of 1, PHY H transmits a HUID with a value of 2, PHY I transmits a LTP with a HUID of 3, and PHY K transmits a LTP with a HUID of 3.

After transmitting a LTP for the minimum duration, the PHY examines the received HUIDs contained within a given received LTS. If any received HUID is greater than the transmitted HUID, the PHY shall not join any connections. That is, any PHY which receives a higher HUID than it is transmitting refrains from any join attempts until the next time around.

Referring now to FIG. 7C, if the maximum received HUID is less than the transmitted HUID, the PHY is free to simultaneously join those connections which are reporting a HUID less than the transmitted HUID. If the received HUID is greater than the transmitted HUID, the PHY must withdraw its bid. Here, PHYs G and H drop out due to their lower HUIDs.

Referring now to FIG. 7C, any untested port receiving a HUID equal to the one being transmitted must refrain from any join attempt until the next time around. Here PHY L drops out due to its equal HUID.

As can be appreciated by those of ordinary skill in the art, the use of random HUIDs will allow all but looped connections to eventually activate.

Join

Referring now to FIG. 7D, the remaining nodes now send a Join Request to the other surviving candidates.

Referring finally to FIG. 7E, a bus reset is performed, and joins are performed on the remaining untested ports.

As those of ordinary skill in the art will appreciate, the system has been built with no loops and only one bus reset.

Multiple Candidate Advantages

As will be appreciated by those of ordinary skill in the art, the multiple candidate process has certain advantages. For example, there is no need for the selection of candidates process that is required in the single candidate scenario. Also, since only one bus reset is required to join multiple candidates, the multiple candidate scenario is likely to result in fewer total bus resets when coming up from ground state. Furthermore, the multiple candidate scenario is easier to weight towards servicing more untested ports per cycle. Finally, there is no special case required for the loop-back-to-self situation, where a user inadvertently connects a device to itself.

Disconnect Detection

As is appreciated by those of ordinary skill in the art, after a user removes the connection that is causing the loop, two separate buses now exist that may be connected. In a preferred embodiment of the present invention, a procedure for detecting such an event is provided. Periodically at a predetermined rate, or after a bus reset, the system will attempt to connect the quarantined branches.

State Diagrams

FIG. 8 shows sequence according to the present invention described in a machine state diagram. In a preferred embodiment of the present invention, state 800 begins the process of selecting one or more candidates. The selected candidates then arbitrate for control and to send a loop test packet in state 802. After winning arbitration, the candidates then send their loop test packets in state 804, and listen for received loop test packets, and compare their transmitted loop test packets (TxLTP) with those received (RxLTP).

If any RxLTP is greater than the TxLTP, the sequence moves to state 806, and the candidate surrenders, and will wait for the receiving bus to return to idle before trying again in state 800. For those candidates whose TxLTP is greater than or equal to the maximum RxLTP, they may join the bus in state 808. The sequence will then return to the selection of candidates state in state 800.

FIG. 9 shows a state machine diagram according to a preferred embodiment of the present invention that includes a contingency for when a device returns from a suspend state. The sequence starts in state 900 with a device in a disconnected state. When the device is connected in state 902, the system is tested for loops. If a loop is found, the device is quarantined in state 904. If no loop is found, then the device may be returned to a resuming state in state 906. If for some reason the device has a Tree-ID timeout while resuming, it will be returned to state 902. When the device becomes active on the bus, it will be in the active state as shown in state 908. Once active, if the device has a Tree-ID timeout it will be returned the untested state in state 902.

However, once a device connection has been tested for loops, it is possible for the user to place the device in a suspend mode. In accordance with a preferred embodiment of the present invention, when a device is in suspended state 910, and is resumed, it will be returned to the resuming state 906.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method of operating a high-speed data bus comprising at least two nodes, said bus and nodes forming a loop, the method comprising:
   determining whether said at least two nodes comprise the same type of node; and
   if said determining indicates the same type of node, breaking said loop between any of said at least two nodes.

2. The method of claim 1, wherein said high-speed bus comprises a serial protocol bus, and said at least two nodes comprise IEEE-1394b-compliant devices.

3. The method of claim 1, wherein said at least two nodes comprises at least first, second, and third nodes all of the same type, and said breaking comprises breaking between either said first and second nodes, or said second an third nodes.

4. The method of claim 1, wherein said at least two nodes comprises at least first, second, and third nodes, said first node and second node being of a first type, and said third node being of a second type; and
   wherein said breaking comprises breaking between said first and second nodes and not between said second and third nodes.

5. A method of loop breaking in a high-speed serialized bus with a plurality of nodes of a first type and at least one node of a second type, the operation of said at least one node being adversely affected by breaking said loop between said at least one node and another node immediately proximate thereto within said loop, the method comprising:
identifying at least two of said first type of node of said plurality that are logically adjacent to one another within said loop; and
breaking said loop between said at least two nodes before breaking said loop at any other location.

6. The method of claim 5, further comprising prohibiting breaking said loop immediately proximate said at least one node.

7. A computerized device for use with a high-speed data bus comprising at least two nodes, said bus and nodes forming a loop, the apparatus comprising:
first apparatus adapted to determine whether said at least two nodes comprise the same type of node; and
second apparatus adapted to, if said determination indicates the same type of node, break said loop between any of said at least two nodes.

8. The device of claim 7, wherein said device comprises one of said at least two nodes.

9. The device of claim 7, wherein said high-speed bus comprises a serial protocol bus, and said at least two nodes comprise IEEE-1394b-compliant devices.

10. The device of claim 7, wherein said at least two nodes comprises at least first, second, and third nodes all of the same type, and said second apparatus is configured to cause breakage of said loop between either said first and second nodes, or said second an third nodes.

11. The device of claim 7, wherein said at least two nodes comprises at least first, second, and third nodes, said first node and second node being of a first type, and said third node being of a second type; and
wherein said second apparatus is configured to cause breakage of said loop between said first and second nodes and not between said second and third nodes.

12. A loop-breaking device for use with a high-speed data bus, the bus comprising a plurality of nodes, said plurality comprising:
(i) at least one of a first type of node being in communication with the device without any other nodes interposed therebetween; and
(ii) at least one of a second type of node;
wherein said bus and nodes form a loop, and the device comprises computer program apparatus adapted to:
detect said loop; and
selectively break said loop between said device and said at least one node of said first type.

13. The device of claim 12, wherein said high-speed bus comprises a serial protocol bus, and said first type of node comprises an IEEE-1394b-compliant device.

14. The device of claim 12, wherein said device and said at least one of a first type of node comprise the same type of device.

15. The device of claim 14, wherein said same type of device comprises a device which is substantially unaffected by an immediately proximate loop break.

16. The device of claim 14, wherein said device comprises an embedded physical layer controller.

17. The device of claim 16, wherein said computer program apparatus comprises part of said physical layer controller.

18. A computerized device adapted for loop breaking in a high-speed serialized bus having a plurality of nodes, comprising:
processing apparatus; and
a computer program adapted to run on said processing apparatus, said computer program adapted to, when executed by said processing apparatus:
identify at least two of a particular type of node of said plurality; and
break said loop selectively between said at least two nodes.

19. The device of claim 18, wherein said computerized device comprises one of said at least two of a particular type of node.

20. The device of claim 18, wherein said identification of at least two of a particular type of node comprises identification of at least two IEEE-1394b-compliant nodes.

21. The device of claim 18, wherein said selective break of said loop by said program comprises breaking said loop between said at least two nodes preferentially over breaking said loop at any other location.

22. The device of claim 21, wherein said plurality of nodes further comprises at least one other node, and breaking of said loop adjacent said at least one other node renders at least said at least one other node inoperative.

23. The device of claim 21, further comprising detecting the formation of a loop within said bus.

24. The device of claim 23, wherein said plurality of nodes further comprises at least one node of a second type, the operation of said at least one node which would be adversely affected if said break of said loop is performed adjacent thereto; and
wherein said break of said loop selectively comprises not breaking said loop adjacent said at least one node so as to avoid said adverse effects.

25. A computerized device adapted for loop breaking in a high-speed serialized bus having a plurality of nodes of a first type and at least one node of a second type, the operation of said at least one node being adversely affected by breaking said loop between said at least one node and another node immediately proximate thereto within said loop, the device comprising:
processing apparatus; and
a computer program, said program adapted to, when executed:
identify at least two of said first type of node of said plurality that are logically adjacent to one another within said loop; and
break said loop between said at least two nodes before breaking said loop at any other location.

26. The device of claim 25, wherein said computerized device comprises one of said at least two of said first type of node.

27. The device of claim 25, wherein said program is further adapted to prohibit breaking said loop immediately proximate said at least one node.

28. A computerized device adapted for loop breaking in a high-speed serialized bus, said bus comprising a plurality of nodes, the device comprising:
a processing apparatus; and
at least one computer program, said at least one program adapted to, when executed on said processing apparatus:
identify a location within said loop and between two of said plurality of nodes where no adverse effects will result from said breaking; and
break said loop between said at least two nodes preferentially over another location within said loop.

29. A method of operating a high-speed data bus comprising at least first and second nodes and loop, said first node comprising a different type of node than said second node and being in communication with said loop via said second node, the method comprising breaking the bus between said first and second node so as to sever said loop from said bus; wherein said first node comprises an IEEE-1394b-compliant node, said second node comprises a hybrid node, and said loop comprises a plurality of IEEE-1394a-compliant nodes.

30. The method of claim 29, wherein said plurality of IEEE-1394a-compliant nodes comprises at least one node which does not have loop-breaking capability.

31. The method of claim 30, wherein said loop comprises only one node that is coupled to said second node.

32. A method of operating a high-speed data bus comprising a plurality of nodes, said plurality comprising:
(i) a plurality of a first type of node, at least two of said plurality of first type of node being in communication with one another without any other nodes interposed therebetween; and
(ii) at least one of a second type of node; and
(iii) at least one of a third type of node, said third type comprising attributes of said first and second types of nodes;
wherein said bus and nodes form a loop, and the method comprises selectively breaking said loop between said at least two nodes.

33. The method of claim 32, wherein said high-speed bus comprises a serial protocol bus, and wherein said at least two nodes comprise IEEE-1394b-compliant devices.

34. The method of claim 32, wherein said plurality of first type of node comprises at least first, second, and third nodes all of the first type, and said breaking comprises breaking between either said first and second nodes, or said second an third nodes.

35. A method of loop breaking in a high-speed serialized bus with a plurality of nodes, comprising:
identifying at least two of a particular type of node of said plurality; and
breaking said loop selectively between said at least two nodes preferentially over breaking said loop at any other location;
wherein said plurality of nodes further comprises at least one other node, and breaking of said loop adjacent to said at least one other node renders at least said at least one other node inoperative.

36. The method of claim 35, wherein said identifying at least two of a particular type of node comprises identifying at least two IEEE-1394b-compliant nodes.

37. The method of claim 35, further comprising detecting the formation of a loop within said bus.

38. The method of claim 37, wherein said plurality of nodes further comprises at least one node of a second type, wherein the operation of said at least one node would be adversely affected if said breaking of said loop is performed adjacent thereto; and
wherein said breaking said loop selectively comprises not breaking said loop adjacent to said at least one node so as to avoid said adverse effects.

39. A method of loop breaking in a high-speed serialized bus with a plurality of nodes, comprising:
identifying at least two of a particular type of node of said plurality; and
breaking said loop selectively between said at least two nodes preferentially over breaking said loop at any other location; and
detecting the formation of a loop within said bus;
wherein said plurality of nodes further comprises at least one node of a second type, the operation of said at least one node being adversely affected if said breaking of said loop is performed adjacent thereto and
wherein said breaking said loop selectively comprises not breaking said loop adjacent said at least one node so as to avoid said adverse effects.

40. The method of claim 39, wherein said identifying at least two of a particular type of node comprises identifying at least two IEEE-1394b-compliant nodes.

41. The method of claim 39, wherein said plurality of nodes further comprises at least one other node, and breaking of said loop adjacent to said at least one other node renders at least said at least one other node inoperative.

42. An IEEE-1394b-compliant device adapted for operation with a high-speed data bus, the bus comprising at least said device, a hybrid node, and a loop comprising a plurality of IEEE-1394a-compliant nodes, said hybrid node comprising a different type of entity than said device, said device being in communication with said loop via said hybrid node, the device comprising computer program apparatus operative to break the bus between itself and the node.

43. The device of claim 42, wherein said loop further comprises at least one node which does not have loop-breaking capability.

44. The device of claim 42, wherein said device comprises an embedded physical layer controller.

45. The device of claim 44, wherein said computer program apparatus comprises part of said physical layer controller.

* * * * *